US012620277B2

(12) United States Patent
Kwon et al.

(10) Patent No.: US 12,620,277 B2
(45) Date of Patent: May 5, 2026

(54) ELECTRONIC DEVICE AND METHOD FOR DIAGNOSING VEHICLE

(71) Applicant: Samsung Electronics Co., Ltd., Gyeonggi-do (KR)

(72) Inventors: Taeho Kwon, Gyeonggi-do (KR); Seongyeol Park, Gyeonggi-do (KR); Youngbin Cho, Gyeonggi-do (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 221 days.

(21) Appl. No.: 18/143,224

(22) Filed: May 4, 2023

(65) Prior Publication Data

US 2023/0274588 A1 Aug. 31, 2023

Related U.S. Application Data

(63) Continuation of application No. 16/980,895, filed on Sep. 15, 2020, now Pat. No. 11,645,878, which is a
(Continued)

(30) Foreign Application Priority Data

Apr. 2, 2018 (KR) ........................ 10-2018-0038226

(51) Int. Cl.
*G07C 5/08* (2006.01)
*B60R 16/023* (2006.01)

(52) U.S. Cl.
CPC ............ *G07C 5/08* (2013.01); *B60R 16/0231* (2013.01)

(58) Field of Classification Search
CPC ........ G07C 5/08; G07C 5/0825; G07C 5/008; G07C 5/0808; B60R 16/0231;
(Continued)

(56) References Cited

U.S. PATENT DOCUMENTS 8,155,924 B2 4/2012 Tracey
10,719,997 B1 * 7/2020 Aiello ................... G07C 5/008
(Continued)

FOREIGN PATENT DOCUMENTS

JP 2004-276828 A 10/2004
JP 2009-535626 A 10/2009
(Continued)

OTHER PUBLICATIONS

Korean Examination Report dated May 9, 2022.

*Primary Examiner* — Behrang Badii
(74) *Attorney, Agent, or Firm* — CANTOR COLBURN LLP

(57) ABSTRACT

According to various embodiments, an electronic device comprises: at least one communication circuit configured to provide communication with a vehicle device or an external electronic device; at least one processor electrically connected to the at least one communication circuit; and a memory electrically connected to the at least one processor, wherein, the memory, when executed, can store instructions configured such that the at least one processor acquires and stores first information related to a vehicle device when connected to the vehicle device, acquires second information related to the vehicle device when the electronic device satisfies specified conditions, determines the state of the vehicle device on the basis of the first information and the second information, and performs a designated operation on the basis of the determination. In addition, other embodiments are possible.

8 Claims, 10 Drawing Sheets

Related U.S. Application Data continuation of application No. PCT/KR2019/003699, filed on Mar. 29, 2019.

(58) Field of Classification Search

CPC .............. B60R 16/0315; B60W 50/02; B60W 50/0205; B60W 2050/021; B60W 2556/45; B60Y 2306/15

See application file for complete search history.

(56)                      References Cited

U.S. PATENT DOCUMENTS

| | | | | |
|---|---|---|---|---|
| 2002/0044049 | A1* | 4/2002 | Saito ....................... | G07C 5/008 |
| | | | | 340/425.5 |
| 2002/0123833 | A1* | 9/2002 | Sakurai .............. | G05B 23/0267 |
| | | | | 701/31.4 |
| 2003/0193390 | A1* | 10/2003 | Muramatsu ........... | B60R 25/102 |
| | | | | 340/426.13 |
| 2003/0208309 | A1* | 11/2003 | Triphathi ............... | G07C 5/085 |
| | | | | 701/33.4 |
| 2007/0265735 | A1 | 11/2007 | Chigusa | |
| 2008/0004764 | A1* | 1/2008 | Chinnadurai ...... | G05B 23/0235 |
| | | | | 701/31.4 |
| 2013/0166138 | A1* | 6/2013 | Yun ........................ | G07C 5/008 |
| | | | | 701/32.6 |
| 2014/0107886 | A1 | 4/2014 | Pierfelice et al. | |
| 2015/0134142 | A1 | 5/2015 | Taylor et al. | |
| 2017/0084177 | A1 | 3/2017 | Matsuoka et al. | |
| 2018/0109622 | A1* | 4/2018 | Galula ................ | H04W 84/005 |
| 2018/0357493 | A1 | 12/2018 | Takamatsu et al. | |
| 2019/0019353 | A1* | 1/2019 | Brent ..................... | G07C 5/008 |
| 2019/0081960 | A1* | 3/2019 | Kupfer ............... | H04L 63/1416 |
| 2019/0143917 | A1 | 5/2019 | Lee et al. | |
| 2019/0378475 | A1 | 12/2019 | Lim et al. | |
| 2020/0294333 | A1* | 9/2020 | Aiello .................. | G07C 5/0808 |

FOREIGN PATENT DOCUMENTS

| | | | |
|---|---|---|---|
| JP | 2017-501069 | A | 1/2017 |
| KR | 10-0789965 | B1 | 1/2008 |
| KR | 10-1306149 | B1 | 9/2013 |
| KR | 10-2013-0110714 | A | 10/2013 |
| KR | 10-2014-0074518 | A | 6/2014 |
| KR | 10-1593571 | B1 | 2/2016 |

* cited by examiner

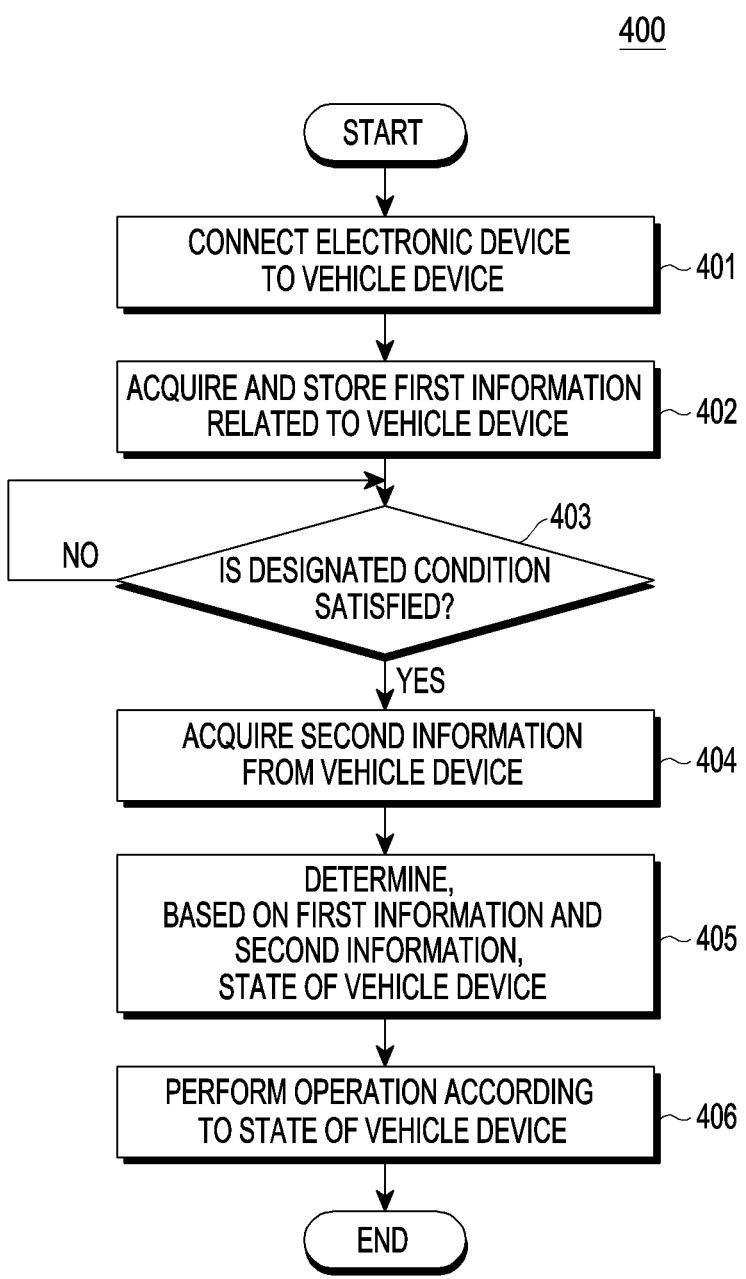

400

START

CONNECT ELECTRONIC DEVICE
TO VEHICLE DEVICE ～401

ACQUIRE AND STORE FIRST INFORMATION
RELATED TO VEHICLE DEVICE ～402

403

NO

IS DESIGNATED CONDITION
SATISFIED?

YES

ACQUIRE SECOND INFORMATION
FROM VEHICLE DEVICE ～404

DETERMINE,
BASED ON FIRST INFORMATION AND
SECOND INFORMATION,
STATE OF VEHICLE DEVICE ～405

PERFORM OPERATION ACCORDING
TO STATE OF VEHICLE DEVICE ～406

END

FIG.4

ELECTRONIC DEVICE AND METHOD FOR DIAGNOSING VEHICLE

CROSS-REFERENCE TO RELATED APPLICATION(S)

This application is a continuation of U.S. patent application Ser. No. 16/980,895, filed on Sep. 15, 2020 and assigned U.S. Pat. No. 11,645,878 issued on May 9, 2023, which is a continuation of PCT International Application No. PCT/KR2019/003699, filed on Mar. 29, 2019, which claims priority to Korean Patent Application No. 10-2018-0038226, filed on Apr. 2, 2018 in the Korean Intellectual Property Office, the disclosures of which are herein incorporated by reference.

TECHNICAL FIELD

Various embodiments relate to an electronic device and a method for diagnosing a vehicle.

Background Art

An OBD (on-board diagnostics) is a device which enables a driver or a mechanic to check and inspect whether or not a vehicle is abnormal by lighting a malfunction indication lamp (MIL) on an instrument panel in a case that a problem occurs in the vehicle.

Examples of an OBD include OBD-I and OBD-II. OBD-I determines a failure due to disconnection/short-circuit of various input or output sensors connected to an engine control unit (ECU), and OBD-II diagnoses rationality and performance of a sensor and whether or not a system is normal as well as a disconnection/short-circuit.

Such an OBD is mounted to the front dashboard side of a currently released vehicle. Since an OBD may be mounted to a vehicle and perform self-diagnosis of the vehicle, a vehicle repair company or a vehicle insurance company can usefully use an OBD. In addition, an OBD enables a driver's driving habits to be determined, so that the driver can fix the driving habits or safely drive a vehicle, based on feedback provided by the OBD.

An OBD may acquire vehicle state information from an ECU of a vehicle. For example, an ECU, which monitors vehicle information through a plurality of sensors in a vehicle, performs communication with an external device of the vehicle, and through such communication, an OBD may acquire, from the ECU, vehicle state information such as vehicle fuel efficiency, revolutions per minute (RPM), a speed, a fuel usage status, a vehicle accident or failure, a battery and consumable status, and a driving time.

DETAILED DESCRIPTION OF THE INVENTION

Technical Problem

The number of ECUs in a vehicle continuously increases with the development of the vehicle, and ECUs are developed differently for different vehicle versions (different engines or transmissions, various options, nationally different versions country by country, and the like). As the number of ECUs mounted to a vehicle increases, the risks due to illegal tuning or mounting of ECUs are increasing. Accordingly, there is a demand for a measure of detecting the state of an ECU mounted to a vehicle.

According to various embodiments, an electronic device and a method for diagnosing a vehicle, by which safety of the vehicle may be determined using information acquired from the vehicle, may be provided.

Technical Solution

According to various embodiments, an electronic device may include: at least one communication circuit configured to provide communication with a vehicle device or an external electronic device: at least one processor electrically connected to the at least one communication circuit; and a memory electrically connected to the at least one processor, wherein the memory stores instructions configured to cause the at least one processor, when executed, to: when connected to the vehicle device, acquire and store first information related to the vehicle device: in a case that the electronic device satisfies a designated condition, acquire second information related to the vehicle device from the vehicle device; based on the first information and the second information, determine the state of the vehicle device; and based on the determination, perform a designated operation.

According to various embodiments, an electronic device may include: at least one communication circuit configured to provide communication with a vehicle device or a first external electronic device: at least one processor electrically connected to the at least one communication circuit; and a memory electrically connected to the at least one processor, wherein the memory stores instructions configured to cause the at least one processor, when executed, to: when connected to the vehicle device, acquire first information related to the vehicle device through the at least one communication circuit: transmit at least a part of the first information to the first external electronic device through the at least one communication circuit: in a case that the electronic device satisfies a designated condition, acquire second information related to the vehicle device from the vehicle device through the at least one communication circuit: transmit at least a part of the second information to the first external electronic device through the at least one communication circuit; and in response to transmission of the first information and the second information, receive, through the at least one communication circuit, information related to the state of the vehicle device determined by the external electronic device from the first external electronic device, and perform, based on the received information, a designated operation.

According to various embodiments, in a storage medium which non-transitorily stores instructions, when executed by at least one circuit, the instructions may be configured to cause the at least one circuit to perform at least one operation, and the at least one operation may include: when an electronic device and a vehicle device are connected, acquiring and storing first information related to the vehicle device: in a case that the electronic device satisfies a designated condition, acquiring second information related to the vehicle device from the vehicle device: based on the first information and the second information, determining the state of the vehicle device; and based on the determination, performing a designated operation.

Advantageous Effects

In various embodiments, an electronic device and a method for diagnosing a vehicle, by which safety of the vehicle may be determined using information acquired from the vehicle, is provided, thereby preventing an illegal tuning or mounting situation of an ECU mounted to the vehicle.

BRIEF DESCRIPTION OF DRAWINGS

FIG. 4 is a flowchart for describing an operation in which an electronic device determines the state of a vehicle device, according to various embodiments.

MODE FOR CARRYING OUT THE INVENTION

Figure 1:
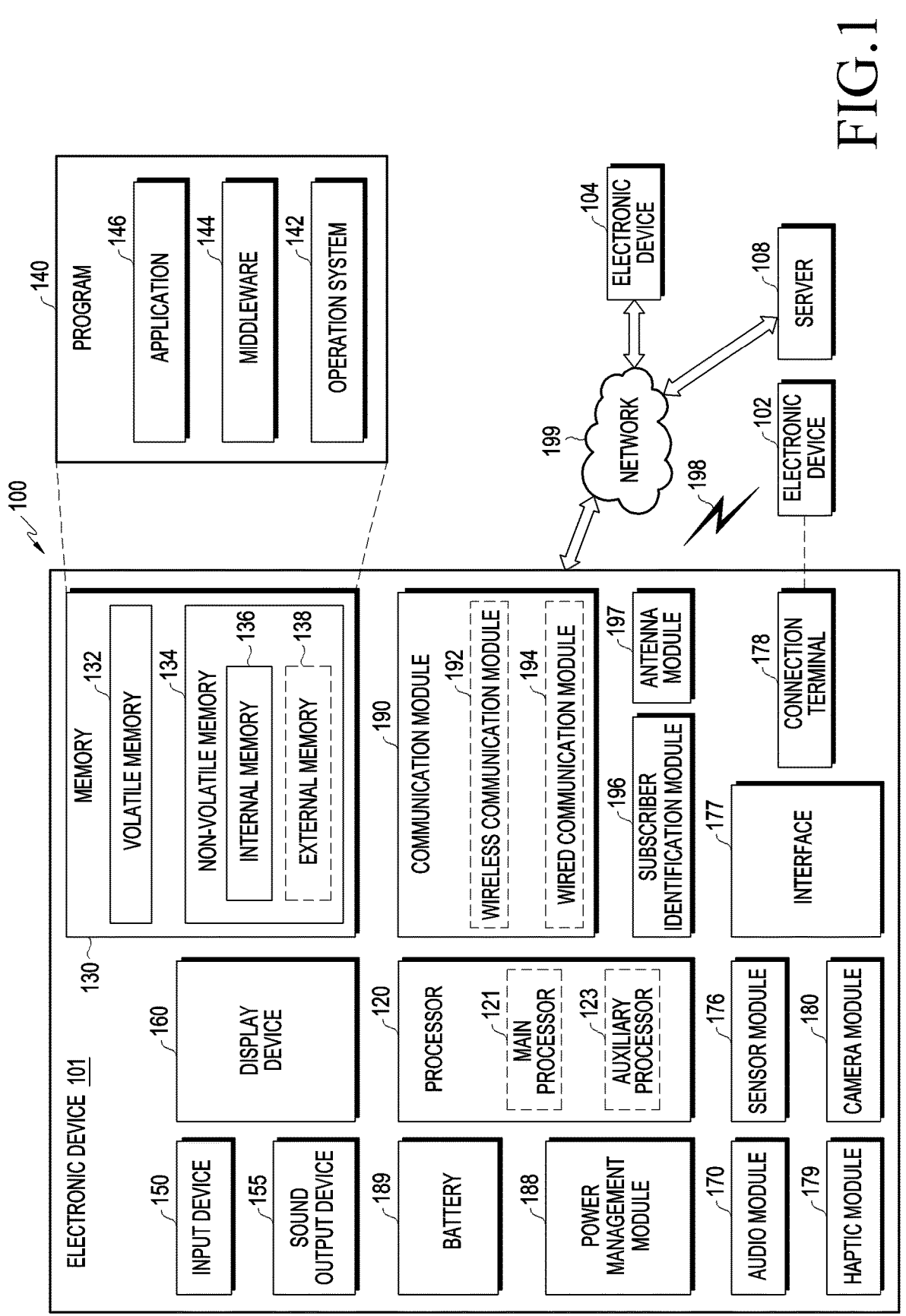
FIG. 1 is a block diagram of an electronic device in a network environment, according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by a component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include a plurality of antennas. In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
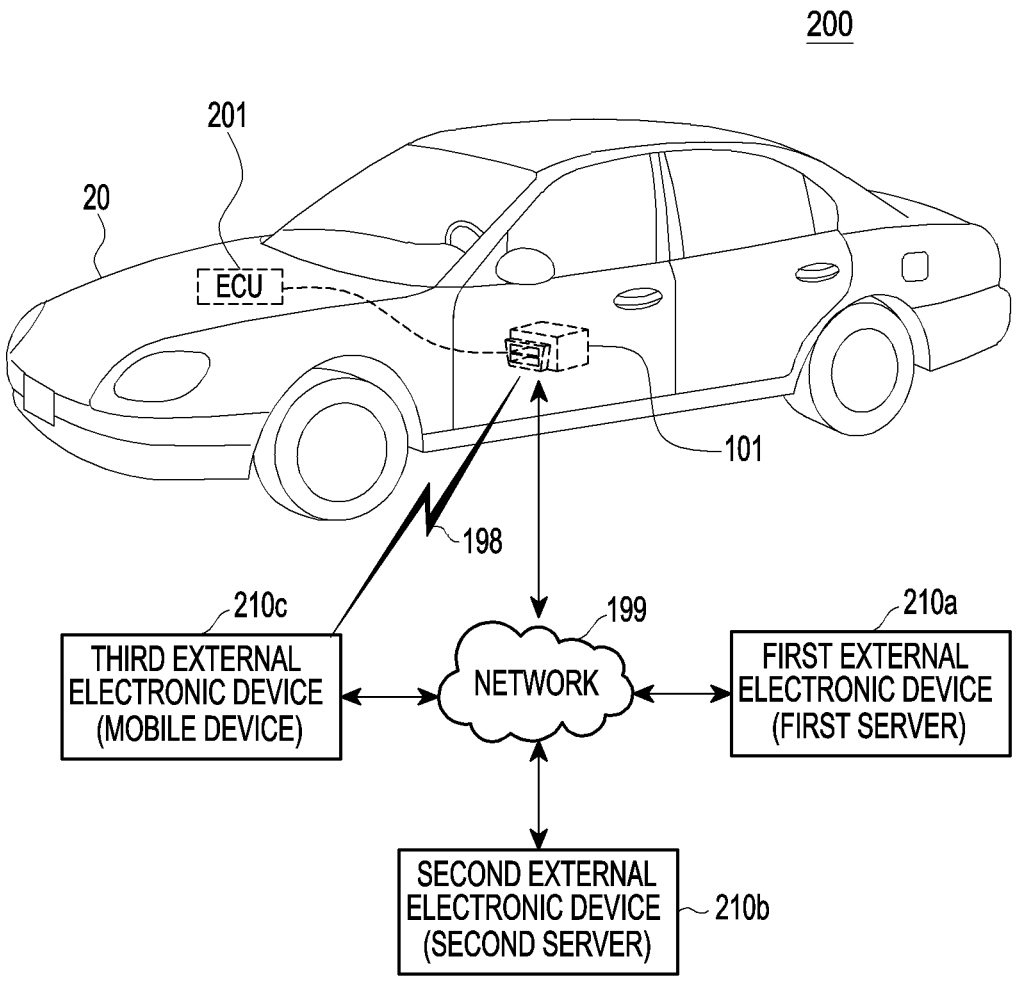
FIG. 2 shows a system in which an electronic device performs communication connection with a vehicle device and an external electronic device, according to various embodiments.

FIG. 2 shows a system 200 in which an electronic device performs communication connection with a vehicle device and an external electronic device, according to various embodiments.

Referring to FIG. 2, a system 200 may include an electronic device 101 (for example: an electronic device 101 of FIG. 1), a vehicle device 201 embedded in a vehicle 20, a first external electronic device 210*a* (for example: a server 108 of FIG. 1), a second external electronic device 210*b* (for example: the server 108 of FIG. 1), and a third external electronic device 210*c* (for example: an electronic device 102 or 104 of FIG. 1).

In FIG. 2, an electronic device 101 according to various embodiments may be connected to a vehicle device 201 embedded in a vehicle 20 to acquire information related to the vehicle 20 while performing communication, or may control the function of the vehicle (20) through the vehicle device 201. An electronic device 101 may include an OBD device based on an on-board diagnostics (OBD) protocol, for example, implemented by omitting at least one (for example: a display device 160 or a camera module 180) among components of an electronic device 101 of FIG. 1 or by adding one or more other components (for example: a second communication module 392).

An electronic device 101 may be electrically connected to a vehicle device 201 to acquire state information of a vehicle 20 from the vehicle device 201. The state information may include, for example, not only information on a driving state of the vehicle 20, such as a speed, a driving time, engine revolutions per minute (RPM), a driving distance, average fuel economy, or instantaneous fuel economy, but also information on an engine state, such as a cooling water temperature, an intake air temperature, an intake air amount, an engine oil temperature, a mission oil temperature, a fuel injection amount, an oxygen sensor voltage, an ignition angle, a carbon discharge amount, or an air-fuel ratio learning amount, a brake state, a battery voltage or current amount, air conditioner coolant pressure, or the like. In addition, in a case that a problem occurs in a vehicle 20, an electronic device 101 may confirm, based on state information of the vehicle 20 acquired from a vehicle device 201, information on a problem occurring in the vehicle 20.

In FIG. 2, a vehicle device 20 according to various embodiments may include at least one engine control unit (ECU) embedded in a vehicle 20 to electronically control various functions related to driving of the vehicle 20, and the like. An ECU may be a system which has an electronic device 101 mounted thereto and supports overall driving function controls of a vehicle 20, and may electronically support, for example, various controls such as a discharge gas control, an engine control, a light control, and a brush control. In addition, an ECU may include a vehicle connector (for example: an OBD terminal, an OBD connector, or the like) for connection to an electronic device 101. A vehicle connector may be provided in at least one shape among various shapes so as to be coupled to a connector of an electronic device 101.

In FIG. 2, a first external electronic device 210*a*, a second external electronic device 210*b*, and a third external electronic device 210*c* according to various embodiments may be an electronic device 101, an electronic device 102, an electronic device 104, or a server 108 illustrated in FIG. 1. A first external electronic device 210*a*, a second external electronic device 210*b*, and a third external electronic device

210*c* may be devices which transmit data to an electronic device 101 connected to a vehicle device 201, or which acquire data from the electronic device 101. The first external electronic device 210*a*, the second external electronic device 210*b*, and the third external electronic device 210*c* may include, for example, at least one among a portable communication devices (for example: a smart phone), a computer device, a portable multimedia device, a portable medical device, a camera, a wearable device, a server, and a cloud server.

A first external electronic device 210*a* (for example: a server 108 of FIG. 1) may communicate with an electronic device 101 through a network 199 (for example: a remote wireless communication network). For example, a first external electronic device 210*a* may be an automobile company server, and when vehicle information (for example: a vehicle identification number (VIN)) related to a vehicle 20 is received from an electronic device 101, information related to the vehicle 20 corresponding to the vehicle information may be provided to the electronic device 101. For example, a first external electronic device 210*a* may provide ECU ID list information corresponding to vehicle information, provide vehicle battery average consumption amount information, provide confirmation of an ECU firmware version, or provide confirmation of vehicle safe limit configuration.

A second external electronic device 210*b* (for example: a server 108 of FIG. 1) may communicate with an electronic device 101 through a network 199. For example, a second external electronic device 210*b* may be a service company server (for example: an insurance company or a rental car or certification company), and may receive, from an electronic device 101, notification of whether or not the state of a vehicle device 201 is abnormal, or provide authentication processing for attestation of the vehicle device 201.

A third external electronic device 210*c* (for example: an electronic device 102 or an electronic device 104 of FIG. 1) may communicate with an electronic device 101 through a local area network 198 (for example: a local area wireless communication network) or a network 199. For example, a third external electronic device 210*c* may be a portable terminal of a user, and may receive, from an electronic device 101, notification of whether or not a vehicle device 201 is in an abnormal state, or transmit, to an electronic device 101, instruction data related to the vehicle device 201. For example, instruction data may be divided into generic instruction data and enhancement instruction data. Generic instruction data may be, for example, instruction data conforming to an OBD-II protocol. In addition, enhancement instruction data may be, for example, instruction data conforming to a format specified according to a manufacturer of an electronic device 101 or a type of a vehicle 20. As another example, a type of instruction data may be divided into control instruction data and acquisition instruction data. Control instruction data is instruction data for controlling a vehicle 20, and may include write instruction data, actuation instruction data, and the like. Acquisition instruction data may include read instruction data as instruction data for acquiring state information of a vehicle 20.

Specifically, control instruction data may include instruction data for locking or unlocking a door of a vehicle 20, instruction data for locking or unlocking a window of a vehicle 20, instruction data for turning on or off a hazard lamp of a vehicle 20, instruction data for turning on or off a right or left lamp of a vehicle 20, instruction data for sounding a horn of a vehicle 20, instruction data for opening or closing a trunk of a vehicle 20, instruction data for driving a brake of a vehicle 20, instruction data for driving an accelerator pedal of a vehicle 20, and the like.

In addition, acquisition instruction data may include instruction data for acquiring the number of key codings of a vehicle 20, instruction data for acquiring the amount of engine oil in a vehicle 20, instruction data for acquiring a state of whether or not a seat belt of a vehicle 20 is worn, instruction data for acquiring a battery life or a battery residual amount of a vehicle 20, instruction data for acquiring a light state of a lamp of a vehicle 20, instruction data for acquiring a gear state of a vehicle 20, instruction data for acquiring a steering wheel angle of a vehicle 20, instruction data for acquiring a brake state of a vehicle 20, instruction data for acquiring a speed of a vehicle 20, instruction data for acquiring engine revolutions per minute of a vehicle 20, and the like. According to various embodiments, acquisition instruction data may include instruction data for acquiring an ECU ID and firmware version of a vehicle device 201, safe limit configuration information and current consumption amounts of a vehicle 20, and a monitoring value of a broadcasting message between ECUs, and an electronic device 101 may acquire information for determining abnormality of the state of a vehicle device 201 by using the acquisition instruction data.

Figure 3:
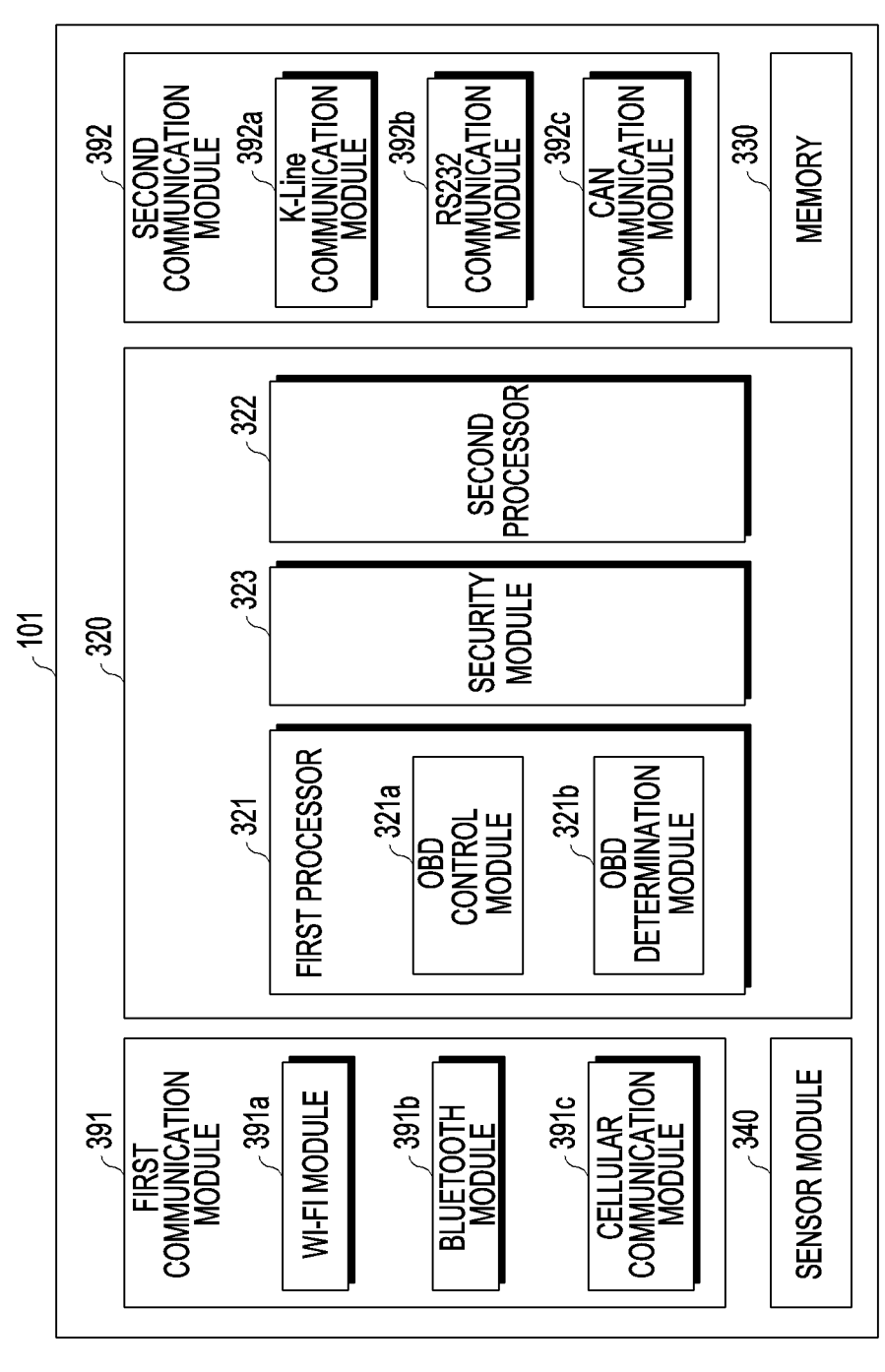
FIG. 3 is a block diagram illustrating the structure of an electronic device, according to various embodiments.

FIG. 3 is a block diagram 300 illustrating the structure of an electronic device, according to various embodiments.

Referring to FIG. 3, an electronic device 101 according to various embodiments may have at least a part of or the same configuration as an electronic device 101 of FIG. 1, and may include an OBD device based on an on-board diagnostics (OBD) protocol, for example, implemented by omitting at least one (for example: a display device 160 or a camera module 180) among components or by adding one or more other components (for example: a second communication module 392). An electronic device 101 may include a processor 320 (for example: a processor 120 of FIG. 1), a first communication module 391 (for example: a communication module 190 of FIG. 1), a second communication module 392 (for example: a vehicle communication module), a sensor module 340 (for example: a sensor module 176 of FIG. 1), and a memory 330 (for example: a memory 130 of FIG. 1). A processor 320 may include a first processor 321 and a second processor 322. In addition, an electronic device 101 may further include an audio processor (not shown) having a microphone and a speaker, a touch pad (not shown) for a touch-based input, an input unit (not shown) supporting a physical key input, a displayer (not shown) for displaying screen data according to an operation of an electronic device 101, a light emitter (not shown) including an LED or the like, a battery (not shown) for supplying power to the above-described components, and the like.

A first communication module 391 and a second communication module 392 may perform communication with a vehicle device 201 and an external electronic device (for example: first to third external electronic devices 210a, 210b, and 210c of FIG. 2, hereinafter, collectively referred to as 210) in a wired or wireless communication manner.

A first communication module 391 and a second communication module 392 may be divided according to the purpose, function, or configuration thereof. For example, a first communication module 391 may communicate with an external electronic device 210, and a second communication module 392 may be divided to perform communication with a vehicle device 201. In addition, a first communication module 391 may perform communication in a wireless communication manner, and a second communication module 392 may be divided to perform communication in a wired communication manner.

A first communication module 391 may communicate with an external electronic device 210 in a wireless communication manner. A first communication module 391 may include, for example, a Wi-Fi module 391a, a Bluetooth module 391b, and a cellular communication module 391c.

An electronic device 101 may wirelessly communicate with an external electronic device 210 (for example: an external servers 210a or 210b) by using a cellular communication module 391c. A cellular communication module 391c may perform communication according to communication standards, for example, IEEE, 3rd generation (3G), 3rd generation partnership project (3GPP), long term evolution (LTE), and the like.

In addition, an electronic device 101 may perform short-range wireless communication with an external electronic device 210 (for example: a mobile device 210c) by using a Wi-Fi module 391a or a Bluetooth module 391b.

A second communication module 392 may communicate with a vehicle device 201 in a wired communication manner. A second communication module 392 may include, for example, a K-Line communication module 392a, an RS-232 communication module 392b, and a CAN communication module 392c. In addition, a second communication module 392 may include a CAN FD communication module, an MOST communication module, an LIN communication module, an Ethernet communication module, a KWP2000 communication module, an ISO 9141 communication module, a PWN communication module, a VPM communication module, a UDS communication module, and the like.

A sensor module 340 may be composed of various sensors for detecting the state of an electronic device 101 and the state of a vehicle 20. For example, a sensor module 340 may include at least one sensor among an acceleration sensor, a gyro sensor, an illumination sensor, a proximity sensor, a pressure sensor, a noise sensor (for example: a microphone), a video sensor (for example: a camera module), a temperature sensor, an impact sensor (a shock sensor), and a timer.

A sensor module 340 may detect, as a state value of a vehicle 20, at least one of an amount of remaining power in a battery of a vehicle 20, a temperature of a vehicle 20, a moving speed of a vehicle 20, whether or not a vehicle 20 is impacted, and acceleration of a vehicle (20). In addition, a sensor module 340 may detect, as state information of an electronic device 101, at least one among the temperature, battery remaining amount, and operation state of the electronic device 101.

A memory 330 may store various sorts of software and data executed and processed by an electronic device 101 and include at least one among a non-volatile memory (for example: a non-volatile memory 134 of FIG. 1) and a volatile memory (for example: a volatile memory 132 of FIG. 1). For example, a memory 330 may store state information acquired from a vehicle device 201 and information related to a vehicle, acquired from an external electronic device 210. In addition, a memory 330 may store a list of external devices which may transmit data to a vehicle device 201 or a list of external devices which may refuse transmission.

A processor 320 may control an overall operation of an electronic device 101. A processor 320 may include a first processor 321 and a second processor 322. A first processor 321 and a second processor 322 may control an operation of an electronic device 101 and may be divided according to the purpose, function, or configuration thereof.

A first processor 321 may be an application processor (AP) (for example: an MSM8916 AP or the like) or the like for driving an application program or an operating system (for example: an Android OS or a Tizen OS). A first processor 321 may include an OBD control module 321*a* for communicating with a second processor 322. In addition, a first processor 321 may include an OBD determination module 321*b* for requesting information related to a vehicle device 201 from the vehicle device 201, acquiring information received from the vehicle device 201 in response to the request, and determining, based on the acquired information, the state of the vehicle device 201.

A second processor 322 may be a micro controller unit (MCU) for performing self-diagnosis of a vehicle device 201 (for example, an OBD-I or OBD-II MCU or the like). A second processor 322 may convert a first format of a request received from a first processor 321 into a different second format (for example: a CAN communication format, a KWP2000 communication format, or the like) transmittable to a vehicle device 201. In addition, a second processor 322 may convert a second format of information received from a vehicle device 201 into a first format transmittable to a first processor 321.

A first processor 321 and a second processor 322 may transmit or receive data between each other through a security module 323 (for example: a security circuit). A security module 323 may be, for example, an embedded secure element (eSE) module. For example, through a security module 323, a first processor 321 may encode acquisition instruction data for an electronic device 101 to acquire state information from a vehicle device 201 and may transmit the encoded acquisition instruction data to a second processor 322. In addition, a second processor 322 may acquire state information of a vehicle device 201 in response to acquisition instruction data, encode the state information through a security module 323, and transmit the encoded state information to a first processor 321. A security module 323 may include an instruction transmission target list and may block transmission of instruction data which does not correspond to the instruction transmission target list.

In addition, in a case that a symptom of abnormality occurs in a first processor 321, a security module 323 may block transmission of instruction data from a first processor 321 to a second processor 322. For example, a processor 320 may include a security area (for example: a trust zone), and by executing a real-time kernel protection (RKP) function in the security area, kernel event hooking processing may be performed. Accordingly, a first processor 321 may monitor an operating system, a kernel, or an application of the first processor 321 in real time, and when a symptom of abnormality (for example: data falsification, hacking by a third party, or the like) is detected in at least one thereof, the first processor 321 may block transmission of instruction data to a second processor 322. As another example, a first processor 321 and a second processor 322 may operate through one processor 320 without being separated. In addition, in a case that a second processor 322 has no security function, a security module 323 may provide a security function to the second processor 322. Otherwise, a security module 323 may not be included in a processor 320.

FIG. 4 is a flowchart 400 for describing an operation in which an electronic device determines the state of a vehicle device, according to various embodiments.

According to various embodiments, operations 401 to 406 may be executed through an electronic device 101 or a processor 120, 320, 321, or 322 of FIGS. 1 to 3. An electronic device 101 may store instructions for executing operations 401 to 406 in a memory (for example: a memory 130 of FIG. 1 or a memory 330 of FIG. 3).

In operation 401, an electronic device 101 (for example: a processor 120, 320, 321, or 322) according to various embodiments may be connected to a vehicle device 201. For example, an electronic device 101 may include an OBD device based on an on-board diagnostics (OBD) protocol. In addition, a vehicle device 201 may include at least one engine control unit (ECU) which is embedded in a vehicle 20 (for example, a vehicle 20 of FIG. 2) and enables electronic control of various functions related to an operation of the vehicle 20. An electronic device 101 may include an OBD connector based on an OBD protocol, and may be connected to a connector provided in a vehicle 20, so that the electronic device 101 and a vehicle device 201 may be electrically connected.

According to various embodiments, when an electronic device 101 is electrically connected to a vehicle device 201, the electronic device 101 may connect wired communication with the vehicle device 201 through a second communication module (for example: a second communication module 392 of FIG. 3) of the electronic device 101. When an electronic device 101 is electrically connected to a vehicle device 201, it may be determined whether or not the connection to the vehicle device 201 is initial connection. For example, when an electronic device 101 connects communication with a vehicle device 201, vehicle information (for example: a vehicle identification number (VIN)) related to a vehicle 20 may be received from the vehicle device 201. An electronic device 101 may confirm whether or not vehicle information received from a vehicle device 201 is stored in a memory of an electronic device 101 (for example: a memory 130 of FIG. 1 or a memory 330 of FIG. 3). In a case that vehicle information is not stored in a memory 330, an electronic device 101 may be determined to have initial connection to a vehicle device 201. When it is determined that an electronic device 101 has initial connection to a vehicle device 201, the electronic device 101 may request, based on vehicle information of the vehicle device 201, information related to the vehicle device from an external electronic device 210 (for example: a first external electronic device 210*a* (for example: a first server) of FIG. 2) through a first communication module (for example: a first communication module 391 of FIG. 3) of the electronic device 101, and may acquire, based on information received from the external electronic device 210*a* in response to the request, first information. An external electronic device 210*a* may be, for example, an automobile company server, and when vehicle information related to a vehicle 20 is received from an electronic device 101, information related to the vehicle 20 corresponding to the vehicle information may be provided to the electronic device 101. For example, information related to a vehicle 20 may include at least one among ECU ID list information corresponding to vehicle information, vehicle battery average consumption amount information, ECU firmware version information, and vehicle safe limit configuration information.

In operation 402, an electronic device 101 (for example: a processor 120, 320, 321, or 322) according to various embodiments may acquire and store first information related to a vehicle device 201. For example, an electronic device 101 may acquire, based on information received from an external electronic device 210*a* in response to a request of information related to a vehicle device, first information, and may store the acquired first information in a memory 330. An electronic device 101 may store acquired first information in a security area of a memory 330. Otherwise, an electronic device 101 may provide a user interface to a user and obtain, based on vehicle information input from the user, information related to a vehicle 20 from an external electronic device 210a. Otherwise, an electronic device 101 may be wirelessly connected to an external electronic device 210 (for example: a third external electronic device 210c (a mobile device) of FIG. 2) through a first communication module (for example: a first communication module 391 of FIG. 3), and may receive, based on vehicle information input from a user through a user interface of the external electronic device 210c, information related to a vehicle 20 from an external electronic device (for example: a first external electronic device 210a (a first server) of FIG. 2). Otherwise, an electronic device 101 may be wirelessly connected to an external electronic device 210 (for example: a third external electronic device 210c (a mobile device) of FIG. 2) through a first communication module 391, and may receive, based on vehicle information configured by the external electronic device 210c, information related to a vehicle 20 from the external electronic device 210c. Based on received information related to a vehicle, an electronic device 101 may acquire at least one among ECU ID list information, vehicle battery average consumption amount information, ECU firmware version information, and vehicle safe limit configuration information of a vehicle device 201, and may store the acquired information in a memory 330.

In operation 403, an electronic device 101 according to various embodiments (for example: a processor 120, 320, 321, or 322) may determine whether or not the electronic device 101 satisfies a designated condition. For example, in a case that an electronic device 101 or a vehicle device 201 is in a state related to rebooting, the electronic device 101 or the vehicle device 201 is in a state related to remounting, or the electronic device 101 is in a state related to an operating attribute (for example: vehicle starting stoppage, vehicle firmware update, vehicle safe limit configuration change, or the like) of the vehicle device 201, or a preconfigured period (for example: a monitoring period) is reached, the electronic device 101 may be determined to satisfy a designated condition. When a designated condition is satisfied, an electronic device 101 may perform operation 404. When a designated condition is not satisfied, a separate operation is not performed until the designated condition is satisfied, or a general operation of an electronic device 101 may be performed.

In operation 404, in a case that it is determined that an electronic device 101 satisfies a designated condition, the electronic device 101 (for example: a processor 120, 320, 321, or 322) according to various embodiments may acquire second information related to a vehicle 20 from a vehicle device 201 through a second communication module (for example: a second communication module 392 of FIG. 3).

According to various embodiments, when a designated condition of an electronic device 101 is a state related to rebooting or remounting of the electronic device 101 or a vehicle device 201 or when a preconfigured period is reached, the electronic device 101 may request information related to the vehicle device 201 from the vehicle device 201 and acquire, based on information received from the vehicle device 201 in response to the request, second information. For example, an electronic device 101 may transmit an instruction request and receive a response to the instruction request to confirm an ECU ID of a vehicle device 201. In an embodiment, an electronic device 101 may transmit the same instruction to all ECUs included in a vehicle device 201 and receive a response thereto to confirm an ECU ID of each of the ECUs. In another embodiment, an electronic device 101 may individually transmit an instruction to each of ECUs included in a vehicle device 201 and receive a response thereto to confirm an ECU ID of each of the ECUs. According to another embodiment, an electronic device 101 may receive a message broadcasted between ECUs of a vehicle device 201 regardless of whether or not the electronic device 101 satisfies a designated condition, and may confirm, based on the received message, each of ECU IDs. Otherwise, an electronic device 101 may receive a message broadcasted between ECUs of a vehicle device 201 and may confirm a pattern (for example: the number of broadcasts, the amount of message data, or the like) of the received message. Otherwise, in order to confirm information related to safe limit configuration of a vehicle device 201 or ECU update version (for example: firmware version) information, an electronic device 101 may transmit a safe limit configuration information request instruction or an ECU update version information request instruction and may receive safe limit configuration information or ECU update version information in response to the instruction request. According to another embodiment, in a case that a designated condition of an electronic device 101 is in a state related to vehicle starting maintenance of a vehicle device 201, the electronic device 101 may confirm a vehicle battery consumption amount for a certain period of time.

In operation 405, an electronic device 101 (for example: a processor 120, 320, 321, or 322) according to various embodiments may determine, based on first information and second information, the state of a vehicle device 201. For example, an electronic device 101 may determine the state of a vehicle device 201 using an ECU ID list of the vehicle device 201 stored in a memory 330 and an ECU ID based on a response from the vehicle device 201. When an ECU ID list of a vehicle device 201 stored in a memory 330 is compared to an ECU ID based on a response and a difference occurs, an electronic device 101 may determine that abnormality occurs in the state of the vehicle device 201. Otherwise, when an ECU ID list of a vehicle device 201 stored in a memory 330 is compared to an ECU ID based on monitoring of a message broadcasted between ECUs of the vehicle device 201 and a difference occurs, an electronic device 101 may determine that abnormality occurs in the state of the vehicle device 201. Otherwise, when a pattern of a message broadcasted between ECUs of a vehicle device 201 stored in a memory 330 is compared to a pattern of a message based on monitoring of a message broadcasted between the ECUs of the vehicle device 201 and a difference occurs, an electronic device 101 may determine that abnormality occurs in the state of the vehicle device 201. Otherwise, when information related to safe limit configuration stored in a memory 330 is compared to safe limit configuration received from a vehicle device 201 and a difference occurs, an electronic device 101 may determine that abnormality occurs in the state of the vehicle device 201. In addition, when ECU update version (for example: firmware version) information stored in a memory 330 is compared to an ECU update version received from a vehicle device 201 and a difference occurs, an electronic device 101 may determine that abnormality occurs in the state of the vehicle device 201. According to another embodiment, when vehicle battery average consumption amount information, stored in a memory 330, at the time of stopping of vehicle starting is compared to a vehicle battery consumption amount confirmed for a certain period of time at the time of stopping of vehicle starting by using a vehicle device 201 and a difference occurs, an electronic device 101 may determine that abnormality occurs in the state of the vehicle device 201.

In operation 406, an electronic device 101 (for example: a processor 120, 320, 321, or 322) according to various embodiments may perform, based on the state of a vehicle device 201, a designated operation. For example, in a case that it is determined that abnormality is detected in the state of a vehicle device 201, an electronic device 101 may notify, through a first communication module (for example: a first communication module 391 of FIG. 3), state abnormality of the vehicle device 201 to an external electronic device 210 (for example: a first external electronic device 210a (a first server), a second external electronic device 210b (a second server), or a third external electronic device 210c (a mobile device) of FIG. 2). Otherwise, in a case that it is determined that abnormality is detected in the state of a vehicle device 201, an electronic device 101 may store an indication of state abnormality of the vehicle device 201 in a security area of a memory 330. For example, a security area of a memory 330 may include an attestation bit indicating the attestation state of a vehicle, and in a case that it is determined that abnormality is detected in the state of a vehicle device 201, an electronic device 101 may configure and store the value of the attestation bit as an inactive value. Attestation of a vehicle may be renewed at regular intervals, and when an attestation renewal period of the vehicle is reached, an external electronic device 210 (for example: a second external electronic device 210b (a second server) of FIG. 2) may determine, based on an attestation bit stored in a security area of a memory 330, extension of attestation of the vehicle.

Figure 5:
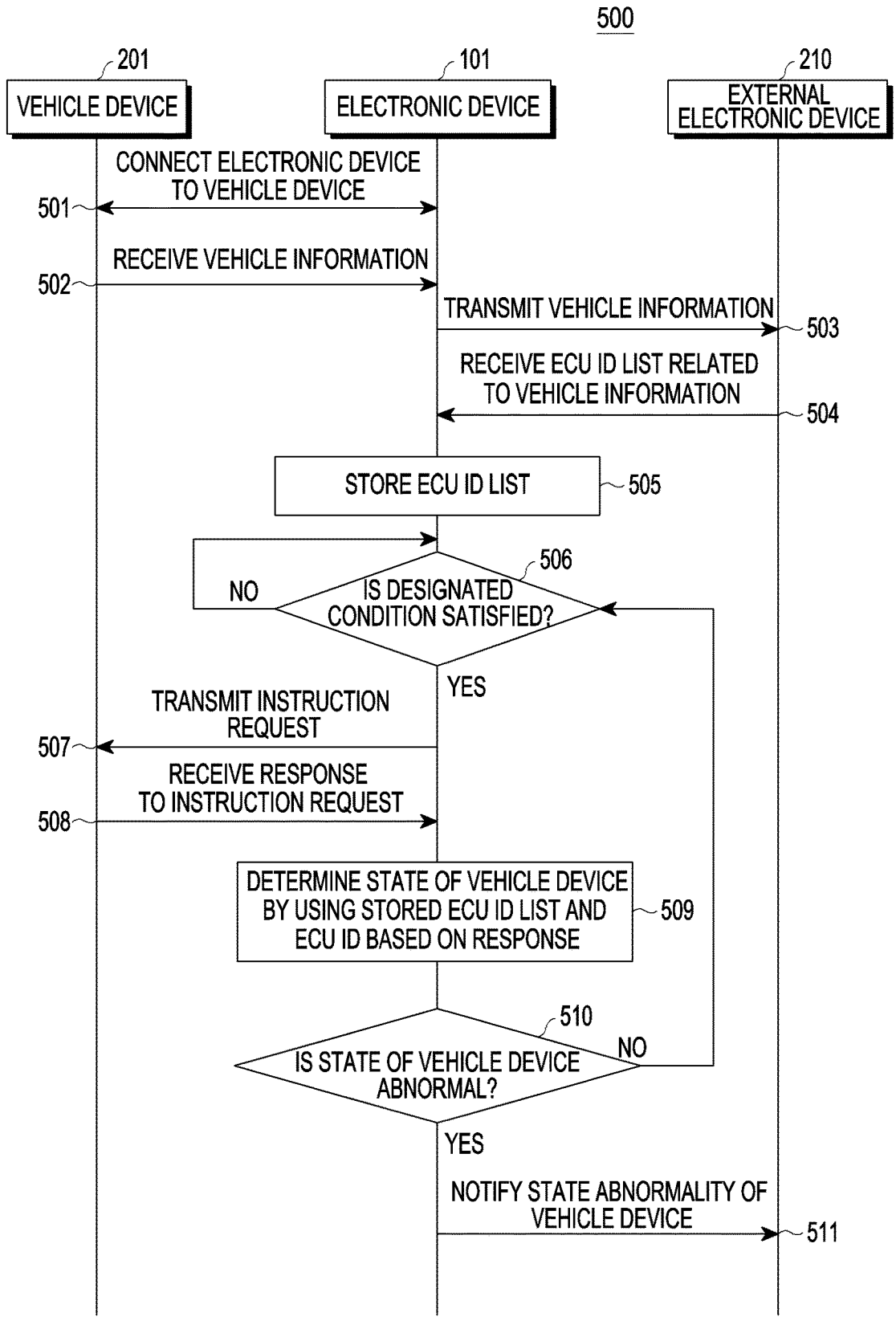
FIG. 5 is a flowchart for describing an operation in which an electronic device and an external electronic device determine the state of a vehicle device, according to various embodiments.

FIG. 5 is a flowchart 500 for describing an operation in which an electronic device and an external electronic device determine the state of a vehicle device, according to various embodiments.

According to various embodiments, operations 501 to 511 may be executed through an electronic device 101 or a processor 120, 320, 321, or 322 of FIGS. 1 to 3. An electronic device 101 may store instructions for executing operations 501 to 511 in a memory (for example: a memory 130 of FIG. 1 or a memory 330 of FIG. 3).

In operation 501, an electronic device 101 (for example: a processor 120, 320, 321, or 322) according to various embodiments may be connected to a vehicle device 201. When an electronic device 101 is electrically connected to a vehicle device 201, it may be determined whether or not the connection to the vehicle device 201 is initial connection. If it is determined that an electronic device 101 has initial connection to a vehicle device 201, the electronic device 101 may request vehicle information (for example: a vehicle identification number (VIN)) related to a vehicle 20 from the vehicle device 201.

In operation 502, an electronic device 101 according to various embodiments (for example: a processor 120, 320, 321, or 322) may receive vehicle information related to a vehicle 20 from a vehicle device 201. In another example, an electronic device 101 may receive vehicle information input from a user through a user interface of the electronic device 101 without receiving vehicle information related to a vehicle 20 from a vehicle device 201. Otherwise, an electronic device 101 may be wirelessly connected to an external electronic device 210 (for example: a third external electronic device 210c (a mobile device) of FIG. 2) through a first communication module (for example: a first communication module 391 of FIG. 3), and may receive vehicle information input from a user through a user interface of the external electronic device 210c.

In operation 503, an electronic device 101 (for example: a processor 120, 320, 321, or 322) according to various embodiments may transmit vehicle information related to a vehicle 20 to an external electronic device 210. An electronic device 101 may request information related to a vehicle 20 corresponding to vehicle information from an external electronic device 210 by transmitting the vehicle information.

In operation 504, an electronic device 101 (for example: a processor 120, 320, 321, or 322) according to various embodiments may receive information related to a vehicle 20 from an external electronic device 210. For example, an electronic device 101 may receive an ECU ID list of a vehicle 20 related to vehicle information from an external electronic device 210.

In operation 505, an electronic device 101 (for example: a processor 120, 320, 321, or 322) according to various embodiments may store a received ECU ID list in a memory 330. For example, an electronic device 101 may store a received ECU ID list in a security area of a memory 330.

In operation 506, an electronic device 101 (for example, a processor 120, 320, 321, and 322) according to various embodiments may determine whether or not an electronic device 101 satisfies a designated condition. For example, in a case that an electronic device 101 or a vehicle device 201 is in a state related to rebooting, an electronic device 101 or a vehicle device 201 is in a state related to remounting, or a preconfigured period (for example: a monitoring period) is reached, an electronic device 101 may be determined to satisfy a designated condition. When a designated condition is satisfied, an electronic device 101 may perform operation 507. When a designated condition is not satisfied, a separate operation is not performed until the designated condition is satisfied, or a general operation of an electronic device 101 may be performed.

In operation 507, in a case that it is determined that an electronic device 101 (for example: a processor 120, 320, 321, or 322) according to various embodiments satisfies a designated condition, the electronic device 101 may transmit, to a vehicle device 201, an instruction request through a second communication module (for example, a second communication module 392 of FIG. 3). For example, an electronic device 101 may transmit the same instruction to all ECUs included in a vehicle device 201 or individually transmit an instruction to each of the ECUs included in the vehicle device 201.

In operation 508, an electronic device 101 (for example: a processor 120, 320, 321, or 322) according to various embodiments may receive a response to an instruction request from a vehicle device 201. For example, an electronic device 101 may transmit the same instruction to all ECUs included in a vehicle device 201 and receive a response thereto to confirm an ECU ID of each of the ECUs. Otherwise, an electronic device 101 may individually transmit an instruction to each of ECUs included in a vehicle device 201 and receive a response thereto to confirm an ECU ID of each of the ECUs.

In operation 509, an electronic device 101 (for example: a processor 120, 320, 321, or 322) according to various embodiments may determine the state of a vehicle device 201 by using an ECU ID based on a response from the vehicle device 201 and an ECU ID list of the vehicle device 201 stored in a memory 330. For example, when an ECU ID list of a vehicle device 201 stored in a memory 330 is compared to an ECU ID based on a response and a difference occurs, an electronic device 101 may determine that abnormality occurs in the state of the vehicle device 201.

In operation 510, in a case that it is determined that abnormality occurs in the state of a vehicle device 201, an electronic device 101 (for example: a processor 120, 320, 321, or 322) according to various embodiments may perform operation 511. Otherwise, in a case that it is determined that abnormality does not occur in the state of a vehicle device 201, an electronic device 101 may perform operation 506 and not perform a separate operation until a designated condition is satisfied, or a general operation of an electronic device 101 may be performed.

In operation 511, in a case that it is determined that abnormality is detected in the state of a vehicle device 201, an electronic device 101 (for example: a processor 120, 320, 321, or 322) according to various embodiments may notify, through a first communication module (for example: a first communication module 391 of FIG. 3), state abnormality of the vehicle device 201 to an external electronic device 210 (for example: a first external electronic device 210a (a first server), a second external electronic device 210b (a second server), or a third external electronic device 210c (a mobile device) of FIG. 2). According to another embodiment, in a case that it is determined that abnormality is detected in the state of a vehicle device 201, an electronic device 101 may store an indication of state abnormality of the vehicle device 201 in a security area of a memory 330. For example, a security area of a memory 330 may include an attestation bit indicating the attestation state of a vehicle, and in a case that it is determined that abnormality is detected in the state of a vehicle device 201, an electronic device 101 may configure and store the value of the attestation bit as an inactive value.

In an embodiment, based on an indication of state abnormality of a vehicle device 201 notified or stored in a security area of a memory 330, state abnormality of the vehicle device 201 may be displayed on a display of an external electronic device 210 or another electronic device.

Figure 6:
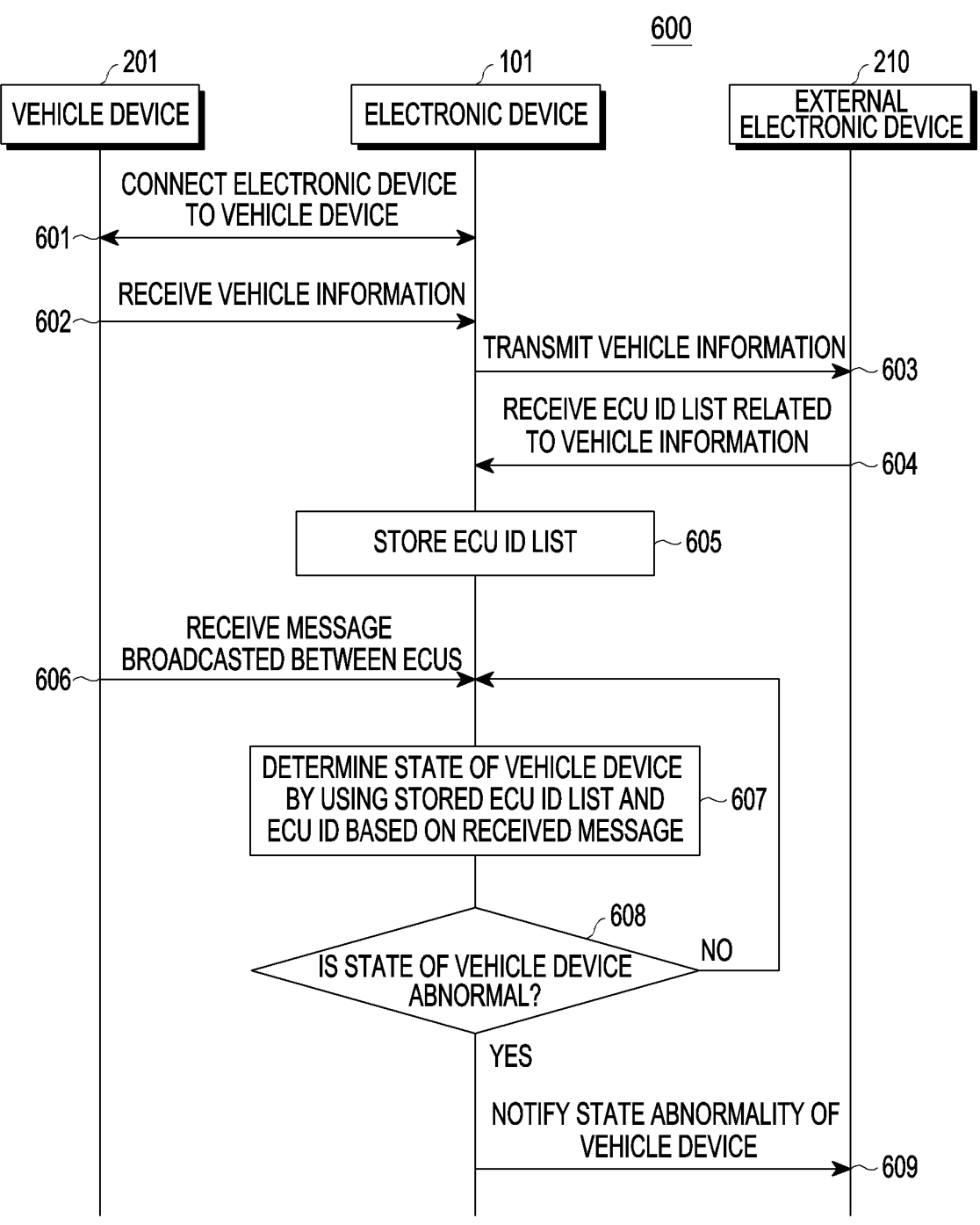
FIG. 6 is a flowchart for describing an operation in which an electronic device and an external electronic device determine the state of a vehicle device, according to various embodiments.

FIG. 6 is a flowchart 600 for describing an operation in which an electronic device and an external electronic device determine the state of a vehicle device, according to various embodiments.

According to various embodiments, operations 601 to 609 may be executed through an electronic device 101 or a processor 120, 320, 321, or 322 of FIGS. 1 to 3. An electronic device 101 may store instructions for executing operations 601 to 609 in a memory (for example: a memory 130 of FIG. 1 or a memory 330 of FIG. 3).

Operations 601 to 605 may be substantially the same as operations 501 to 505. An electronic device 101 may be connected to a vehicle device 201, receive vehicle information from the vehicle device 201, transmit the vehicle information to an external electronic device 210, receive an ECU ID list related to the vehicle information from the external electronic device 210, and store the received ECU ID in a memory 330.

In operation 606, an electronic device 101 (for example: a processor 120, 320, 321, or 322) according to various embodiments may receive a message broadcasted between ECUs of a vehicle device 201. For example, an electronic device 101 may receive a message broadcasted between ECUs of a vehicle device 201 and confirm, based on the received message, each of ECU IDs. Otherwise, an electronic device 101 may receive a message broadcasted between ECUs of a vehicle device 201 and confirm a pattern (for example: the number of broadcasts, the amount of message data, or the like) of the received message.

In operation 607, an electronic device 101 (for example: a processor 120, 320, 321, or 322) according to various embodiments may determine the state of a vehicle device 201 by using an ECU ID list of the vehicle device 201 stored in a memory 330 and an ECU ID based on monitoring of a message broadcasted between ECUs of the vehicle device 201. For example, when an ECU ID list of a vehicle device 201 stored in a memory 330 is compared to an ECU ID based on monitoring of a message broadcasted between ECUs of the vehicle device 201 and a difference occurs, an electronic device 101 may determine that abnormality occurs in the state of the vehicle device 201. According to another embodiment, when a pattern of a message broadcasted between ECUs of a vehicle device 201 stored in a memory 330 is compared to a pattern of a message based on monitoring of a message broadcasted between the ECUs of the vehicle device 201 and a difference occurs, an electronic device 101 may determine that abnormality occurs in the state of the vehicle device 201.

In operation 608, in a case that it is determined that abnormality occurs in the state of a vehicle device 201, an electronic device 101 (for example: a processor 120, 320, 321, or 322) according to various embodiments may perform operation 609. Otherwise, in a case that it is determined that abnormality does not occur in the state of a vehicle device 201, an electronic device 101 may perform operation 606 and perform an operation of receiving and monitoring a message broadcasted between ECUs of a vehicle device 201.

In operation 609, when it is determined that abnormality is detected in the state of a vehicle device 201, an electronic device 101 (for example: a processor 120, 320, 321, or 322) according to various embodiments may notify, through a first communication module (for example: a first communication module 391 of FIG. 3), state abnormality of the vehicle device 201 to an external electronic device 210 (for example: a first external electronic device 210a (a first server), a second external electronic device 210b (a second server), or a third external electronic device 210c (a mobile device) of FIG. 2). According to another embodiment, when it is determined that abnormality is detected in the state of a vehicle device 201, an electronic device 101 may store an indication of state abnormality of the vehicle device 201 in a security area of a memory 330.

In an embodiment, based on an indication of state abnormality of a vehicle device 201 notified or stored in a security area of a memory 330, state abnormality of the vehicle device 201 may be displayed on a display of an external electronic device 210 or another electronic device.

Figure 7:
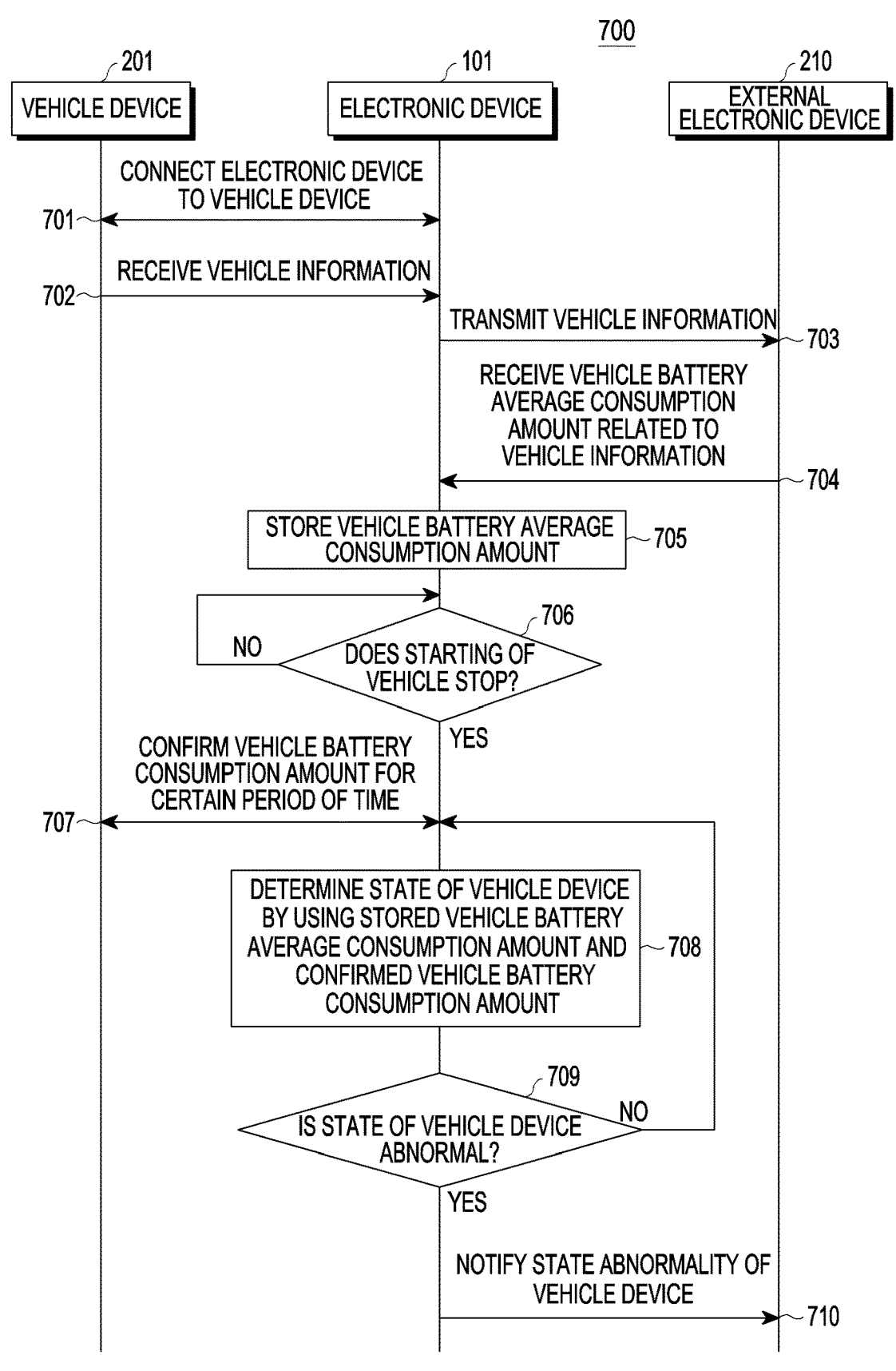
FIG. 7 is a flowchart for describing an operation in which an electronic device and an external electronic device determine the state of a vehicle device, according to various embodiments.

FIG. 7 is a flowchart 700 for describing an operation in which an electronic device and an external electronic device determine the state of a vehicle device, according to various embodiments.

According to various embodiments, operations 701 to 710 may be executed through an electronic device 101 or a processor 120, 320, 321, or 322 of FIGS. 1 to 3. An electronic device 101 may store instructions for executing operations 701 to 710 in a memory (for example: a memory 130 of FIG. 1 or a memory 330 of FIG. 3).

Operations 701 to 703 may be substantially the same as operations 501 to 503 or operations 601 to 603. An electronic device 101 may be connected to a vehicle device 201, receive vehicle information from the vehicle device 201, and transmit the vehicle information to an external electronic device 210.

In operation 704, an electronic device 101 (for example: a processor 120, 320, 321, or 322) according to various embodiments may receive vehicle battery average consumption amount information from an external electronic device 210. For example, vehicle battery average consumption amount information may be information on a battery consumption amount for a certain period of time after elapsing of a certain period of time from a time point when starting of a vehicle 20 has stopped. Otherwise, without depending on an external electronic device 210, an electronic device 101 may autonomously collect vehicle battery average consumption amount information to calculate vehicle battery average consumption amount information.

In operation 705, an electronic device 101 (for example: a processor 120, 320, 321, or 322) according to various embodiments may store vehicle battery average consumption amount information received from an external electronic device 210. In addition, in a case that an electronic device 101 autonomously collects vehicle battery average consumption amount information without depending on an external electronic device 210 and calculates and stores battery average consumption amount information, information may be maintained up to date by collecting and updating information on a consumption amount of a battery whenever starting of a vehicle 20 stops. Moreover, a battery has a property of basically deteriorated after a time elapses, and thus information on a consumption amount of a battery may be corrected in consideration of a production year, driving distance, driving time, battery usage period, and the like of a vehicle. Furthermore, a battery has a property of being differently consumed according to surrounding temperatures, an external air temperature at a time point when information on a consumption amount of a battery is collected may be stored together.

In operation 706, an electronic device 101 (for example: a processor 120, 320, 321, or 322) according to various embodiments may determine whether or not starting of a vehicle 20 stops. In a case that starting of a vehicle stops, an electronic device 101 may perform operation 707. Otherwise, in a case that starting of a vehicle does not stop, a separate operation may not be performed until starting of a vehicle 20 stops, or a general operation of the electronic device 101 may be performed.

In operation 707, when starting of a vehicle stops, an electronic device 101 (for example: a processor 120, 320, 321, or 322) according to various embodiments may transmit acquisition instruction data for acquiring a battery consumption amount to a vehicle device 201 at a time point after a certain period of time elapses, and may confirm information on a battery consumption amount for a certain period of time.

In operation 708, an electronic device 101 (for example: a processor 120, 320, 321, or 322) according to various embodiments of the disclosure may determine the state of a vehicle device 201 by using a vehicle battery average consumption amount stored in a memory 330 and a confirmed vehicle battery consumption amount. For example, when average consumption amount information of a vehicle battery when starting of a vehicle stops, stored in a memory 330, is compared to a vehicle battery consumption amount confirmed, using a vehicle device 201, for a certain period of time when starting of a vehicle stops and a difference occurs, an electronic device 101 may determine that abnormality occurs in the state of the vehicle device 201. An ECU of a vehicle device 201 may be illegally mounted, or an operation of an ECU may be stopped or excessively operated due to illegal tuning, and in this case, a battery usage amount may change. Thus, by detecting such a difference, state abnormality of a vehicle device 201 may be determined.

In operation 709, in a case that it is determined that abnormality occurs in the state of a vehicle device 201, an electronic device 101 (for example: a processor 120, 320, 321, or 322) according to various embodiments may perform operation 710. Otherwise, in a case that it is determined that abnormality does not occur in the state of a vehicle device 201, an electronic device 101 may perform operation 707, and the electronic device 101 may continue an operation of transmitting acquisition instruction data for acquiring a battery consumption amount to the vehicle device 201 and confirming information on a battery consumption amount for a certain period of time.

In operation 710, in a case that it is determined that abnormality is detected in the state of a vehicle device 201, an electronic device 101 (for example: a processor 120, 320, 321, or 322) according to various embodiments may notify, through a first communication module (for example: a first communication module 391 of FIG. 3), state abnormality of the vehicle device 201 to an external electronic device 210 (for example: a first external electronic device 210*a* (a first server), a second external electronic device 210*b* (a second server), or a third external electronic device 210*c* (a mobile device) of FIG. 2). According to another embodiment, when it is determined that abnormality is detected in the state of a vehicle device 201, an electronic device 101 may store an indication of state abnormality of the vehicle device 201 in a security area of a memory 330.

In an embodiment, based on an indication of state abnormality of a vehicle device 201 notified or stored in a security area of a memory 330, state abnormality of the vehicle device 201 may be displayed on a display of an external electronic device 210 or another electronic device.

Figure 8:
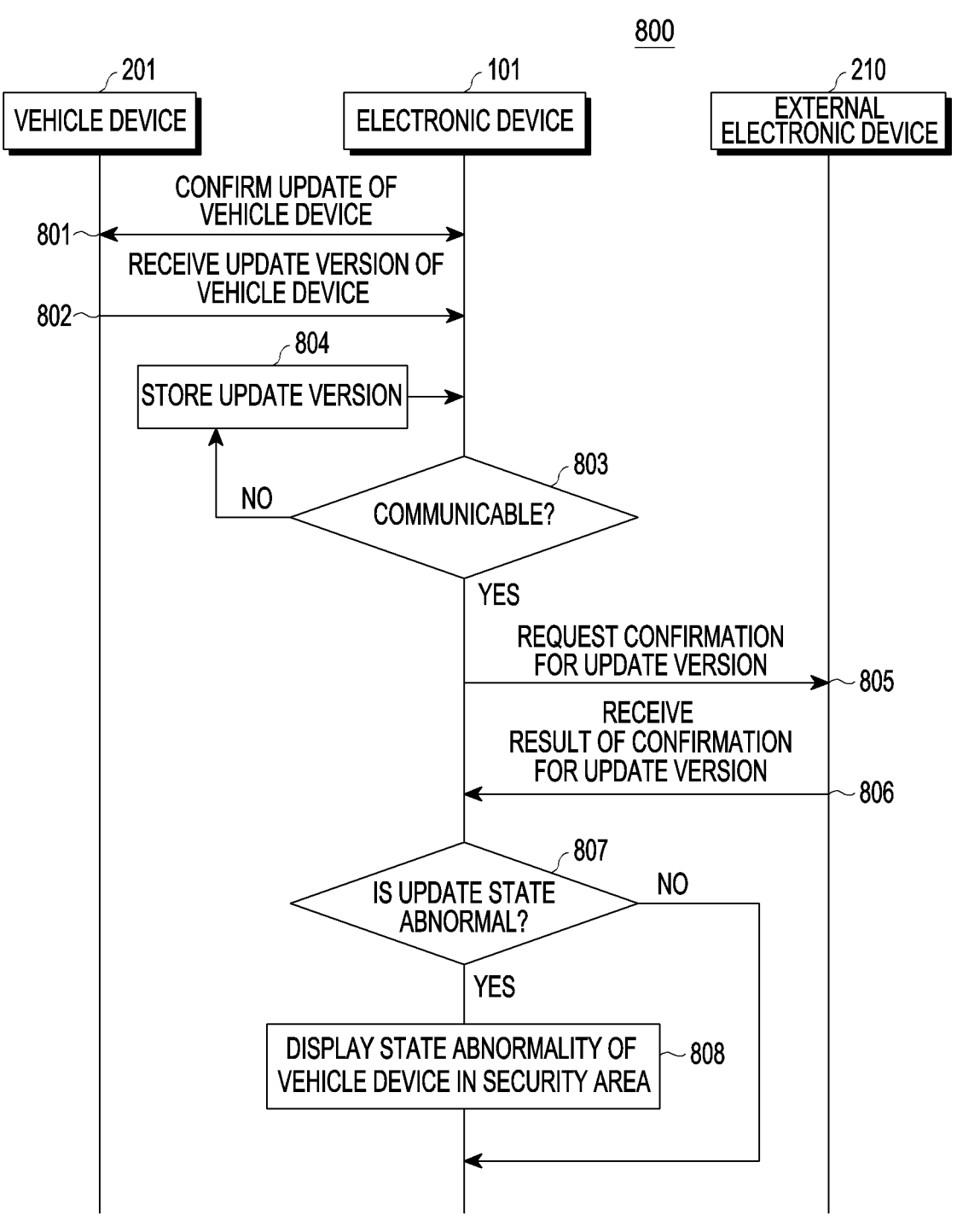
FIG. 8 is a flowchart for describing an operation in which an electronic device and an external electronic device determine the state of a vehicle device, according to various embodiments.

FIG. 8 is a flowchart 800 for describing an operation in which an electronic device and an external electronic device determine the state of a vehicle device, according to various embodiments.

According to various embodiments, operations 801 to 808 may be executed through an electronic device 101 or a processor 120, 320, 321, or 322 of FIGS. 1 to 3. An electronic device 101 may store instructions for executing operations 801 to 808 in a memory (for example: a memory 130 of FIG. 1 or a memory 330 of FIG. 3).

In operation 801, an electronic device 101 (for example: a processor 120, 320, 321, or 322) according to various embodiments may confirm an update of a vehicle device 201. For example, an electronic device 101 may transmit an update version information request instruction of a vehicle device 201 to confirm an update of a vehicle device 201.

In operation 802, an electronic device 101 (for example: a processor 120, 320, 321, or 322) according to various embodiments may receive update version information of a vehicle device 201 in response to an update version information request instruction from the vehicle device 201. Otherwise, in a case that a vehicle device 201 performs an update, an electronic device 101 may confirm update version (for example: firmware version) information according to execution of an update.

In operation 803, an electronic device 101 (for example: a processor 120, 320, 321, or 322) according to various embodiments may confirm whether or not communication with an external electronic device 210 is possible. For example, an electronic device 101 may perform operation 804 in a case that communication with an external electronic device 210 is not possible, and the electronic device 101 may perform operation 805 in a case that communication is possible.

In operation 804, in a case that communication with an external electronic device 210 is not possible, an electronic device 101 (for example: a processor 120, 320, 321, or 322) according to various embodiments may store acquired update information of a vehicle device 201 in a memory 330. Acquired update information of a vehicle device 201 may be stored in a security area of a memory 330. An electronic device 101 may store update information in a memory 330, and may perform operation 805 when communication with an external electronic device 210 becomes possible.

In operation 805, an electronic device 101 (for example: a processor 120, 320, 321, or 322) according to various embodiments may request, from an external electronic device 210, confirmation for acquired update version information of a vehicle device 201. An external electronic device 210 may compare, based on vehicle information included in a confirmation request, update version information corresponding to the vehicle information to received update version information to determine the state of update version information.

In operation 806, an electronic device 101 (for example: a processor 120, 320, 321, or 322) according to various embodiments may receive a result of confirmation for update version information from an external electronic device 210.

In operation 807, in a case that it is determined that abnormality occurs in an update state, an electronic device 101 (for example: a processor 120, 320, 321, or 322) according to various embodiments may perform operation 808. Otherwise, in a case that it is determined that abnormality does not occur in an update state, a separate operation may not be performed, or a general operation of an electronic device 101 may be performed.

In operation 808, in a case that it is determined that abnormality occurs in an update state, an electronic device 101 (for example: a processor 120, 320, 321, or 322) according to various embodiments may determine that abnormality occurs in the state of a vehicle device 201 and store an indication of state abnormality of the vehicle device 201 in a security area of a memory 330. For example, a security area of a memory 330 may include an attestation bit indicating the attestation state of a vehicle, and in a case that it is determined that abnormality is detected in the state of a vehicle device 201, an electronic device 101 may configure and store the value of the attestation bit as an inactive value. Attestation of a vehicle may be renewed at regular intervals, and when an attestation renewal period of the vehicle is reached, an external electronic device 210 (for example: a second external electronic device 210b (a second server) of FIG. 2) may determine, based on an attestation bit stored in a security area of a memory 330, extension of attestation of the vehicle.

Figure 9:
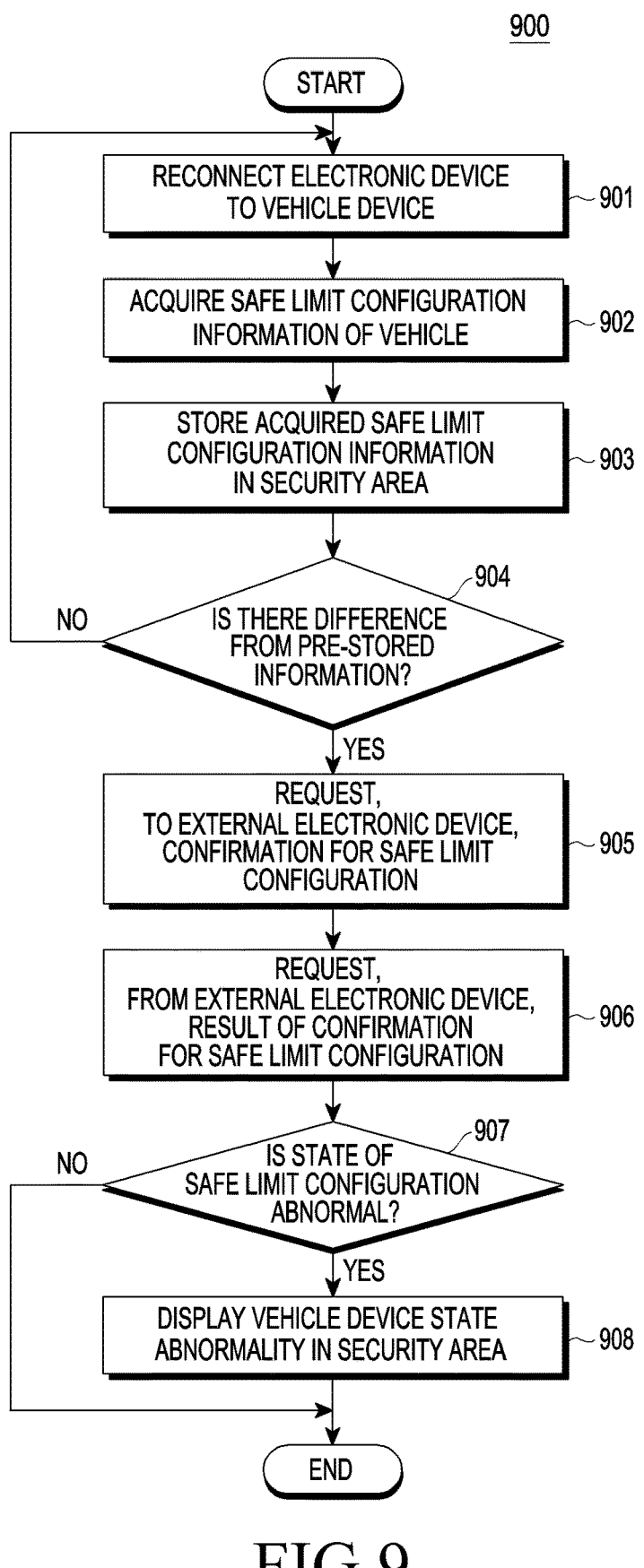
FIG. 9 is a flowchart for describing an operation in which an electronic device determines the state of a vehicle device, according to various embodiments.

FIG. 9 is a flowchart 900 for describing an operation in which an electronic device determines the state of a vehicle device, according to various embodiments. According to various embodiments, operations 901 to 908 may be executed through an electronic device 101 or a processor 120, 320, 321, or 322 of FIGS. 1 to 3. An electronic device 101 may store instructions for executing operations 901 to 908 in a memory (for example: a memory 130 of FIG. 1 or a memory 330 of FIG. 3).

In operation 901, an electronic device 101 (for example: a processor 120, 320, 321, or 322) according to various embodiments may be reconnected to a vehicle device 201. For example, when an electronic device 101 is electrically connected to a vehicle device 201, wired communication with the vehicle device 201 may be connected through a second communication module (for example: a second communication module 392 of FIG. 3) of the electronic device 101. When an electronic device 101 is electrically connected to a vehicle device 201, it may be determined whether or not the connection is reconnection to the vehicle device 201. For example, an electronic device 101 may receive vehicle information (for example: a vehicle identification number (VIN)) related to a vehicle 20 from a vehicle device 201, and it may be confirmed whether or not received vehicle information is stored in a memory (for example, a memory 130 of FIG. 1 or a memory 330 of FIG. 3) of an electronic device 101. In a case that vehicle information is stored in a memory 330, an electronic device 101 may determine that connection to a vehicle device 201 is reconnection.

In operation 902, an electronic device 101 (for example: a processor 120, 320, 321, or 322) according to various embodiments may transmit a safe limit configuration information request instruction to a vehicle device 201 and receive safe limit configuration information in response to an instruction request.

In operation 903, an electronic device 101 (for example: a processor 120, 320, 321, or 322) according to various embodiments may store safe limit configuration information acquired from a vehicle device 201 in a security area of a memory 330.

In operation 904, an electronic device 101 (for example: a processor 120, 320, 321, or 322) according to various embodiments may determine whether or not stored safe limit configuration information is different from information previously stored in a security area of a memory 330. For example, before acquired safe limit configuration information is stored in a memory 330, an electronic device 101 may confirm safe limit configuration information previously stored in a memory 330 (for example: a snapshot), and may determine whether or not there is a difference after the acquired safe limit configuration information is stored. In a case that it is determined that there is a difference from pre-stored information, an electronic device 101 may perform operation 905, and in a case that there is no difference, a separate operation may not be performed or a general operation of the electronic device 101 may be performed.

In operation 905, an electronic device 101 (for example: a processor 120, 320, 321, or 322) according to various embodiments may request, from an external electronic device 210, confirmation for a difference from previously stored information. An external electronic device 210 may determine the state of safe limit configuration information by comparing, based on vehicle information included in a confirmation request, safe limit configuration information corresponding to the vehicle information to information requested to be confirmed.

In operation 906, an electronic device 101 (for example: a processor 120, 320, 321, or 322) according to various embodiments may receive a result of confirmation of safe limit configuration information from an external electronic device 210.

In operation 907, in a case that it is determined that abnormality occurs in the state of safe limit configuration information, an electronic device 101 (for example: a processor 120, 320, 321, or 322) according to various embodiments may perform operation 908. Otherwise, in a case that it is determined that abnormality does not occur in the state of safe limit configuration information, an electronic device 101 may not perform a separate operation, or a general operation of the electronic device 101 may be performed.

In operation 908, in a case that it is determined that abnormality occurs in the state of safe limit configuration information, an electronic device 101 (for example: a processor 120, 320, 321, or 322) according to various embodiments may determine that abnormality occurs in the state of a vehicle device 201 and store an indication of state abnormality of the vehicle device 201 in a security area of a memory 330. For example, a security area of a memory 330 may include an attestation bit indicating the attestation state of a vehicle, and in a case that it is determined that abnormality is detected in the state of a vehicle device 201, an electronic device 101 may configure and store the value of the attestation bit as an inactive value. Attestation of a vehicle may be renewed at regular intervals, and when an attestation renewal period of the vehicle is reached, an external electronic device 210 (for example: a second external electronic device 210b (a second server) of FIG. 2) may determine, based on an attestation bit stored in a security area of a memory 330, extension of attestation of the vehicle.

Figure 10:
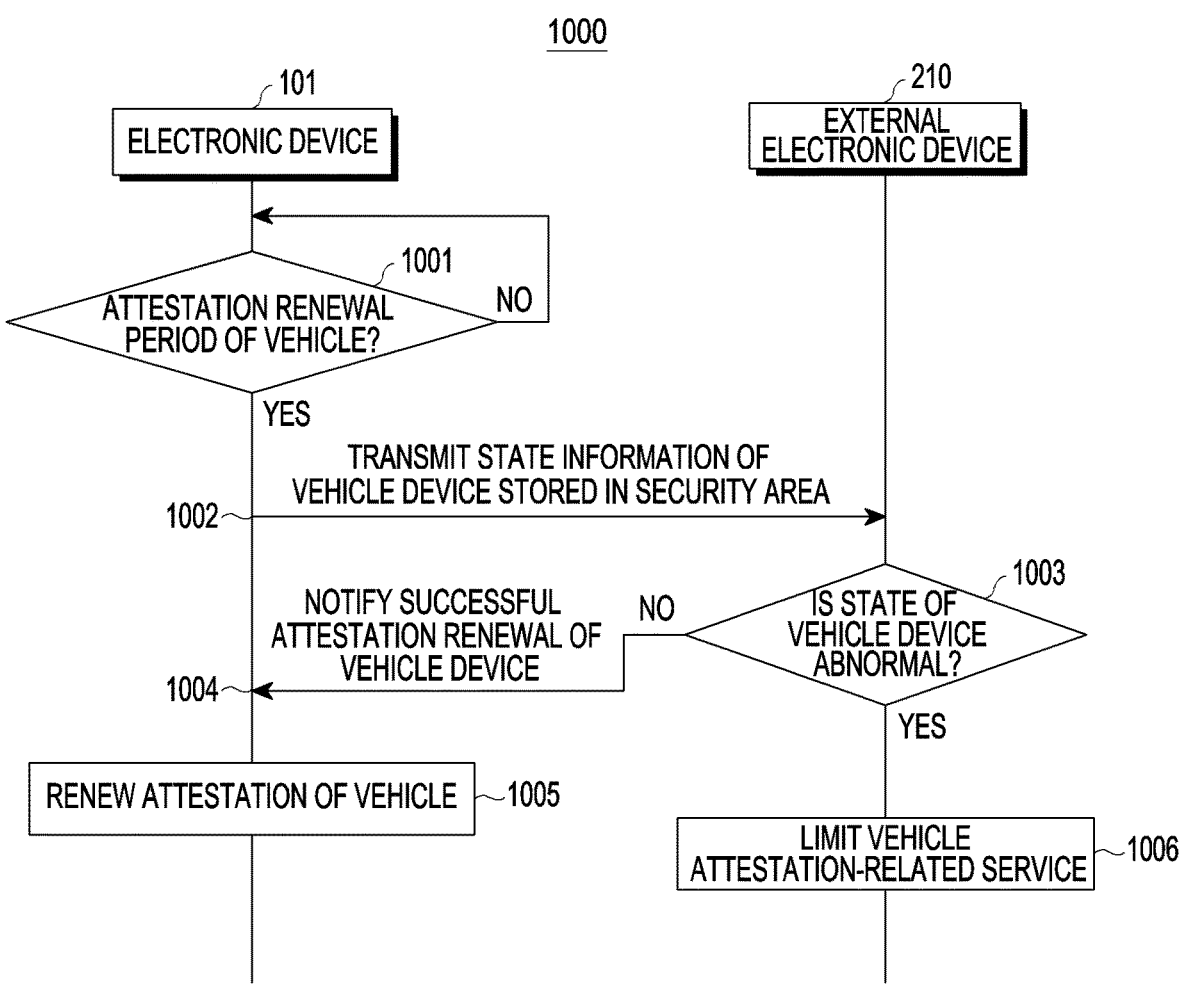
FIG. 10 is a flowchart for describing an operation in which an electronic device and an external electronic device determine the state of a vehicle device, according to various embodiments.

FIG. 10 is a flowchart 1000 for describing an operation in which an electronic device and an external electronic device determine the state of a vehicle device, according to various embodiments.

According to various embodiments, operations 1001 to 1006 may be executed through an electronic device 101 or a processor 120, 320, 321, or 322 of FIGS. 1 to 3. An electronic device 101 may store instructions for executing operations 1001 to 1006 in a memory (for example: a memory 130 of FIG. 1 or a memory 330 of FIG. 3).

In operation 1001, an electronic device 101 (for example: a processor 120, 320, 321, or 322) according to various embodiments may determine whether or not an attestation renewal period of a vehicle 20 is reached. In a case that an attestation renewal period of a vehicle 20 is reached, an electronic device 101 may perform operation 1002. In a case that an attestation renewal period of a vehicle 20 is not reached, a separate operation is not performed or a general operation of an electronic device 101 may be performed.

In operation 1002, in a case that an attestation renewal period of a vehicle 20 is reached, an electronic device 101 (for example, a processor 120, 320, 321, or 322) according to various embodiments may transmit state information of a vehicle device 201 stored in a security area of a memory 330 to an external electronic device 210. For example, an electronic device 101 may encode state information of a vehicle device 201 and transmit the encoded information to an external electronic device 210.

In operation 1003, an external electronic device 210 according to various embodiments (for example: a second external electronic device 210b (a second server) of FIG. 2) may determine, based on received state information of a vehicle device 201, the state of the vehicle device 201. For example, an external electronic device 210 may decode encoded state information of a vehicle device 201 and confirm decoded state information of the vehicle device 201. For example, state information of a vehicle device 201 transmitted to an external electronic device 210 may include an attestation bit indicating the attestation state of a vehicle. An external electronic device 210 may confirm whether or not the value of an attestation bit is active or inactive, and when the value of the attestation bit is active, the external electronic device 210 may determine that there is no abnormality in the state of a vehicle device 201 and perform operation 1004. Otherwise, when the value of the attestation bit is inactive, an external electronic device 210 may determine that there is abnormality in the state of a vehicle device 201 and perform operation 1006.

In operation 1004, an electronic device 101 (for example: a processor 120, 320, 321, or 322) according to various embodiments may receive notification of successful attestation renewal of a vehicle device 201 from an external electronic device 210.

In operation 1005, an electronic device 101 (for example: a processor 120, 320, 321, or 322) according to various embodiments may renew attestation of a vehicle 20 by renewing an expiration time of an attestation bit stored in a security area of a memory 330.

In operation 1006, an external electronic device 210 (for example: a second external electronic device 210b (a second server) of FIG. 2) according to various embodiments may process attestation renewal of a vehicle 20 as a failure and configure a limit to a vehicle attestation-related service. In addition, an external electronic device 210 may notify a failure of attestation renewal of a vehicle 20 to another external electronic device 210 (for example: a first external electronic device 210a (a first server) of FIG. 2) or a third external electronic device 210c (a mobile device)).

According to various embodiments, in a case that abnormality occurs in the state of a vehicle 20, an external electronic device 210 may limit a service according to a service policy or provide warning notification to a user. In such a scenario, Mr./Ms. A, who owns an automobile of company B, has illegally mapped a vehicle device 201 (for example: ECU) embedded in a vehicle 20 to improve the performance of the vehicle 20 after purchasing the vehicle. ECU illegal mapping means changing reference vehicle output setting values of a manufacturer. Such ECU illegal mapping may increase harmful exhaust gas emissions or cause damage to a vehicle engine. During free AS (warranty) period, an engine of a vehicle has been damaged due to excessive ECU illegal mapping of Mr./Ms. A, and Mr./Ms. A has requested free repair after restoring ECU firmware of a vehicle device 201 to an original state. However, a service center of company B may confirm illegal mapping of a vehicle 20 through detection, recording, and notification functions of an abnormal ECU update according to various embodiments and may refuse free AS of the vehicle.

In another scenario, Mr./Ms. C has mounted, to a vehicle 20, an electronic device 101 (for example: an OBD terminal) provided by an insurance company with a condition of return of a partial insurance premium for achievement of one-year safe driving. However, after buying insurance, Mr./Ms. C, infringing a contract, has allowed safe limit configuration (for example: limit configuration for DMB watching, DVD movie watching, or navigation operation during driving) values to be canceled in an illegal automobile repair shop. The insurance company may confirm an illegal change in safe limit configuration of a vehicle 20 through detection, recording, and notification functions of abnormal safe limit configuration according to various embodiments and may refuse return of an insurance premium.

An electronic device (for example: an electronic device 101 of FIGS. 1 to 3) according to various embodiments may include: at least one communication circuit (for example: a communication module 190 of FIG. 1, a first communication module 391 of FIG. 3, or a second communication module 392 of FIG. 3) configured to provide communication with a vehicle device (for example: an electronic device 102 of FIG. 1 or an electronic device 201 of FIG. 2, hereinafter, collectively referred to as 201) or an external electronic device (for example: an electronic device 101, an electronic device 102, an electronic device 104, or a server 108 of FIG. 1 or first to third external electronic devices 210a, 210b, or 210c of FIG. 2, hereinafter, collectively referred to as 210): at least one processor (for example: a processor 120 of FIG. 1, a processor 320 of FIG. 3, a first processor 321 of FIG. 3, or a second processor 322 of FIG. 3) electrically connected to the at least one communication circuit 190, 391, or 392; and a memory (for example: a memory 130 of FIG. 1 or a memory 330 of FIG. 3) electrically connected to the at least one processor 120, 320, 321, or 322, wherein the memory 130 or 330 stores instructions configured to cause the at least one processor 120, 320, 321, or 322, when executed, to: when connected to the vehicle device 201, acquire and store first information related to the vehicle device 201: in a case that the electronic device 101 satisfies a designated condition, acquire second information related to the vehicle device 201 from the vehicle device 201: based on the first information and the second information, determine the state of the vehicle device 201; and based on the determination, perform a designated operation.

In the electronic device 101 according to various embodiments, the electronic device 101 may include a device based on an on-board diagnostics (OBD) protocol, and the vehicle device 201 may include at least one engine control unit (ECU) embedded in a vehicle (for example: a vehicle 20 of FIG. 2).

In the electronic device 101 according to various embodiments, the instructions may be configured to cause the processor 120, 320, 321, or 322 to: when electrically connected to the vehicle device 201, determine whether or not the connection to the vehicle device 201 is initial connection: when it is determined that the connection to the vehicle device 201 is initial connection, request, based on initial connection of the vehicle device 201, information related to the vehicle device 201 from the external electronic device 210 through the at least one communication circuit 190, 391, or 392: acquire, based on information received from the external electronic device 210 in response to the request, the first information through the at least one communication circuit 190, 391, or 392; and store the acquired first information in the memory 130 or 330.

In the electronic device 101 according to various embodiments, the instructions may be configured to cause the processor 120, 320, 321, or 322 to: when electrically connected to the vehicle device 201, determine whether or not the connection to the vehicle device is initial connection; when it is determined that the connection to the vehicle device 201 is initial connection, request information related to the vehicle device 201 from the vehicle device 201 through the at least one communication circuit 190, 391, or 392: acquire, based on information received from the vehicle device 201 in response to the request, the first information through the at least one communication circuit 190, 391, or 392; and store the acquired first information in the memory 130 or 330.

In the electronic device 101 according to various embodiments, the designated condition may include at least one among a condition in which the electronic device 101 or the vehicle device 201 is in a state related to rebooting, a condition in which the electronic device 101 or the vehicle device 201 is in a state related to remounting, a condition in a state related to an operation attribute of the vehicle device 201, or a condition in a state in which a preconfigured period is reached.

In the electronic device 101 according to various embodiments, the instructions may be configured to cause the processor 120, 320, 321, or 322 to: in a case that the electronic device 101 satisfies a designated condition, request information related to the vehicle device 201 from the vehicle device 201 through the at least one communication circuit 190, 391, or 392; and based on information received from the vehicle device 201 in response to the request, acquire the second information through the at least one communication circuit 190, 391, or 392.

In the electronic device 101 according to various embodiments, the instructions may be configured to cause the processor 120, 320, 321, or 322 to acquire, based on a message broadcasted from the vehicle device 201, the second information through the at least one communication circuit 190, 391, or 392 in a case that the electronic device 101 satisfies a designated condition.

In the electronic device 101 according to various embodiments, the state of the vehicle device 201 may include at least one among whether or not an identifier of at least one engine control unit (ECU) embedded in a vehicle 20 is abnormal, a battery consumption amount related to an operation of the vehicle 20, whether or not data between the at least one ECU is abnormal, whether or not a firmware version of the at least one ECU is abnormal, or whether or not safe limit configuration for the vehicle 20 is abnormal.

In the electronic device 101 according to various embodiments, the instructions may be configured to cause the processor 120, 320, 321, or 322 to notify an abnormality state of the vehicle device 201 to the external electronic device 210 through the at least one communication circuit 190, 391, or 392 in a case that it is determined that the state of the vehicle device 201 is detected to be abnormal.

In the electronic device 101 according to various embodiments, the instructions may be configured to cause the processor 120, 320, 321, or 322 to store an abnormality state of the vehicle device 201 in a security area of the memory 130 or 330 in a case that it is determined that the state of the vehicle device 201 is detected to be abnormal.

The at least one communication circuit 190, 391, or 392 may include: a first communication circuit (for example: a first communication module 391 of FIG. 3) configured to provide wireless communication (for example: a local area wireless communication network 198 of FIG. 1 or 2 or a long distance wireless communication network 199 of FIG. 1 or 2) with the external electronic device 210; and a second communication circuit (for example: a second communication module 392 of FIG. 3) electrically connected to the vehicle device 201 and configured to provide wired communication (for example: wired communication through a connection terminal 178 of FIG. 1).

In the electronic device 101 according to various embodiments, the at least one processor 120, 320, 321, or 322 may include: a first processor (for example: a first processor 321 of FIG. 3) configured to request information related to the vehicle device 201 from the vehicle device 201, acquire information received from the vehicle device 201 in response to the request, and determine, based on the acquired information, the state of the vehicle device 201; and a second processor (for example: a second processor 322 of FIG. 3) configured to convert a first format of the request received from the first processor 321 into a different second format transmittable to the vehicle device 201 and convert a second format of information received from the vehicle device 201 into the first format transmittable to the first processor 321.

The electronic device 101 according to various embodiments may further include a security circuit (for example: a security module 323 of FIG. 3) configured to encode or block data transmitted or received between the first processor 321 and the second processor 322.

An electronic device (for example: an electronic device 101 of FIGS. 1 to 3) according to various embodiments may include: at least one communication circuit 190, 391, or 392 configured to provide communication with a vehicle device 201 or a first external electronic device (for example: an electronic device 101, an electronic device 102, an electronic device 104, or a server 108 of FIG. 1 or a first external electronic device 210a of FIG. 2): at least one processor 120, 320, 321, or 322 electrically connected to the at least one communication circuit 190, 391, or 392; and a memory 130 or 330 electrically connected to the at least one processor 120, 320, 321, or 322, wherein the memory 130 or 330 stores instructions configured to cause the at least one processor 120, 320, 321, or 322, when executed, to: when connected to the vehicle device 201, acquire first information related to the vehicle device 201 through the at least one communication circuit 190, 391, or 392; transmit at least a part of the first information through the at least one communication circuit 190, 391, or 392 to the first external electronic device 210*a*: in a case that the electronic device 101 satisfies a designated condition, acquire second information related to the vehicle device 201 from the vehicle device 201 through the at least one communication circuit 190, 391, or 392: transmit at least a part of the second information to the first external electronic device 210*a* through the at least one communication circuit 190, 391, or 392; and in response to transmission of the first information and the second information, receive, through the at least one communication circuit 190, 391, or 392, information related to the state of the vehicle device 201 determined by the first external electronic device 210*a* from the first external electronic device 210*a*, and perform, based on the received information, a designated operation.

In the electronic device 101 according to various embodiments, the designated condition may include at least one among a condition in which the electronic device 101 or the vehicle device 201 is in a state related to rebooting, a condition in which the electronic device 101 or the vehicle device 201 is in a state related to remounting, a condition in a state related to an operation attribute of the vehicle device 201, or a condition in a state in which a preconfigured period is reached.

In the electronic device 101 according to various embodiments, the instructions may be configured to cause the processor 120, 320, 321, or 322 to: in a case that the electronic device 101 satisfies a designated condition, request information related to the vehicle device 201 from the vehicle device 201 through the at least one communication circuit 190, 391, or 392; and based on information received from the vehicle device 201 in response to the request, acquire the second information through the at least one communication circuit 190, 391, or 392.

In the electronic device 101 according to various embodiments, the instructions may be configured to cause the processor 120, 320, 321, or 322 to acquire, based on a message broadcasted from the vehicle device 201, the second information through the at least one communication circuit 190, 391, or 392 in a case that the electronic device 101 satisfies a designated condition.

In the electronic device 101 according to various embodiments, the state of the vehicle device 201 may include at least one among whether or not an identifier of at least one engine control unit (ECU) embedded in a vehicle 20 is abnormal, a battery consumption amount related to an operation of the vehicle 20, whether or not data between the at least one ECU is abnormal, whether or not a firmware version of the at least one ECU is abnormal, or whether or not safe limit configuration for the vehicle 20 is abnormal.

In the electronic device 101 according to various embodiments, the instructions may be configured to cause the processor 120, 320, 321, or 322 to notify an abnormality state of the vehicle device 201 to a second external electronic device (for example: an electronic device 101, an electronic device 102, an electronic device 104, or a server 108 of FIG. 1 or a second external electronic device 210*b* of FIG. 2) through the at least one communication circuit 190,

391, or 392 or store an abnormality state of the vehicle device 201 in a security area of the memory 130 or 330 in a case that it is determined that the state of the vehicle device 201 is detected to be abnormal.

In a storage medium which non-transitorily stores instructions according to various embodiments, when executed by at least one circuit, the instructions may be configured to cause the at least one circuit to perform at least one operation, and the at least one operation may include: when an electronic device 101 and a vehicle device 201 are connected, acquiring and storing first information related to the vehicle device 201: in a case that the electronic device 101 satisfies a designated condition, acquiring second information related to the vehicle device 201 from the vehicle device 201: based on the first information and the second information, determining the state of the vehicle device 201; and based on the determination, performing a designated operation.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. A portable communication terminal A telecommunication phone, comprising:
   a display:
   a communication circuit;
   at least one processor electrically connected to the communication circuit; and
   memory electrically connected to the at least one processor, wherein the memory stores instructions configured to cause the telecommunication phone, when executed, to:
   establish, through the communication circuit, a communication connection with an electronic device mounted on a vehicle,
   based on the communication connection, transmit, through the communication circuit, information on an electronic control unit identification list, corresponding to the vehicle, stored in the memory to the electronic device, and
   based on transmission of the information on the electronic control unit identification list, receive, through the communication circuit, a first notification indicating that at least one electronic control unit mounted on the vehicle is in abnormal state, and display, through the display, a user interface corresponding to the first notification,
   wherein the abnormal state is determined based on a difference between one or more electronic control unit identifications included in the electronic control unit identification list and the at least one electronic control unit of the vehicle.

2. The telecommunication phone of claim 1, wherein the instructions configured to cause the at least one processor to transmit, through the communication circuit, information on a firmware version of the electronic control unit of the vehicle, or information on a safety limit configuration of the vehicle.

3. The telecommunication phone of claim 2, wherein the instructions configured to cause the telecommunication phone to, based on the transmission of the information on the firmware version of the electronic control unit of the vehicle, or the information on the safety limit configuration of the vehicle, receive, through the communication circuit, at least one notification indicating that the vehicle is in abnormal state.

4. The telecommunication phone of claim 3, wherein the safety limit configuration of the vehicle configures the vehicle to limit digital media broadcasting (DMB) display within the vehicle, and/or navigation input functions during operation of the vehicle.

5. One or more non-transitory computer-readable storage media storing one or more computer programs including computer-executable instructions that, when executed by one or more processors of a telecommunication phone individually or collectively, cause the telecommunication phone to perform operations, the operations comprising:
   establishing, through a communication circuit of the telecommunication phone, a communication connection with an electronic device mounted on a vehicle,
   based on the communication connection, transmitting, through the communication circuit, information on an electronic control unit identification list, corresponding to the vehicle, stored in memory to the electronic device, and
   based on transmission of the information on the electronic control unit identification list, receiving, through the communication circuit, a first notification indicating that at least one electronic control unit mounted on the vehicle is in abnormal state, and displaying, through the display, a user interface corresponding to the first notification,
   wherein the abnormal state is determined based on a difference between on or more electronic control unit identifications included in the electronic control unit identification list and the at least one electronic control unit of the vehicle.

6. The one or more non-transitory computer-readable storage media of claim 5, the operations comprising transmitting, through the communication circuit, information on a firmware version of the electronic control unit of the vehicle, or information on a safety limit configuration of the vehicle.

7. The one or more non-transitory computer-readable storage media of claim 6, the operations comprising, based on the transmission of the information on the firmware version of the electronic control unit of the vehicle, or the information on the safety limit configuration of the vehicle, receiving, through the communication circuit, at least one notification indicating that the vehicle is in the abnormal state.

8. The one or more non-transitory computer-readable storage media of claim 7, wherein the safety limit configuration of the vehicle configures the vehicle to limit digital media broadcasting (DMB) display within the vehicle, and/or navigation input functions during operation of the vehicle.

* * * * *